April 23, 1957 E. C. POLIDOR ET AL 2,789,354
PROFILE CONTOUR MACHINE
Filed Jan. 21, 1949 12 Sheets-Sheet 1

INVENTORS
Edward C. Polidor, Willis De Boer
and Gilbert A. Betts.
BY
Parker, Kirchner Farmer,
Attorneys.

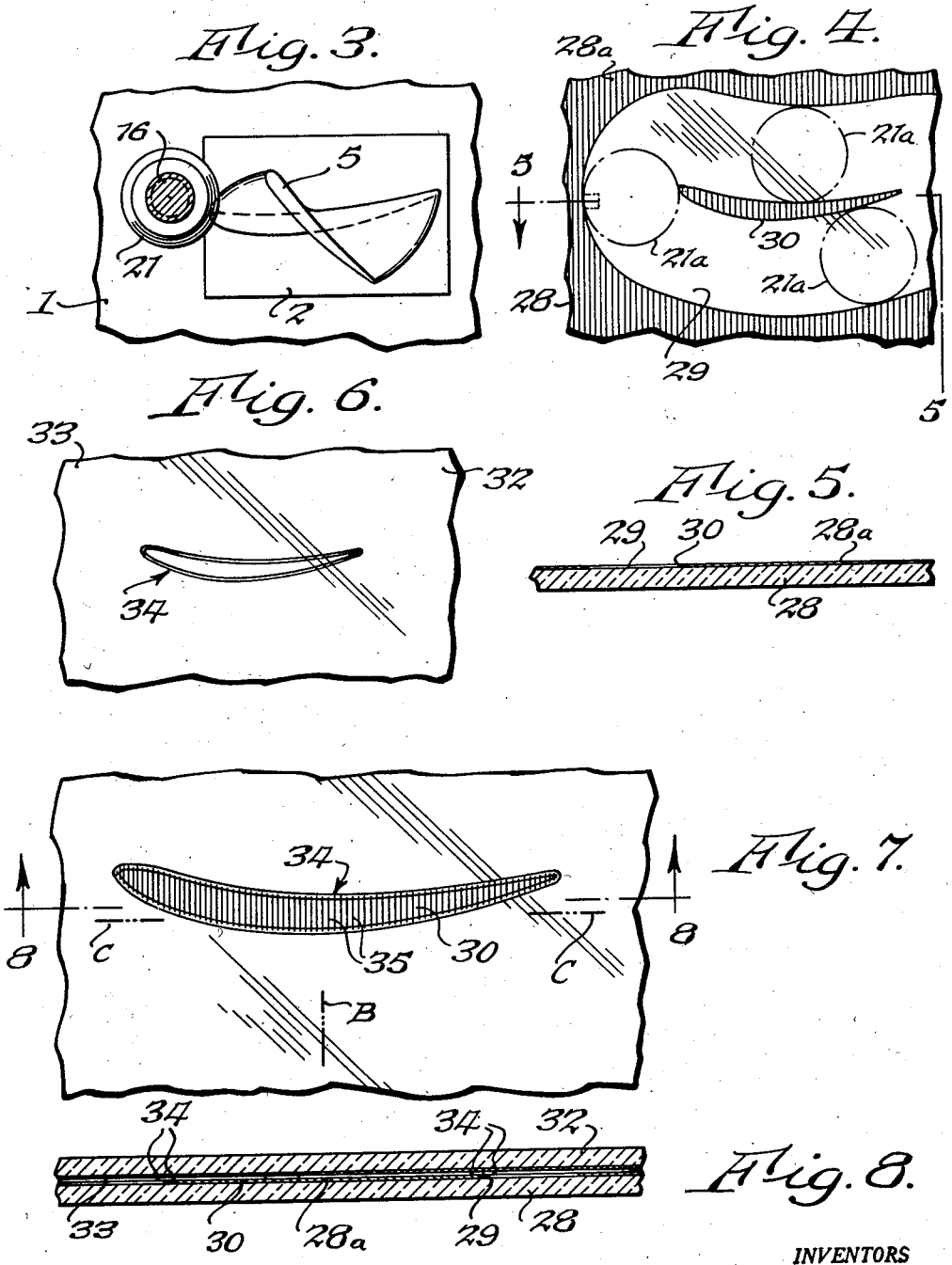

INVENTORS
Edward C. Polidor, Willis De Boer
and Gilbert O. Betts
BY
Parker, Pinchnow Farmer,
Attorneys.

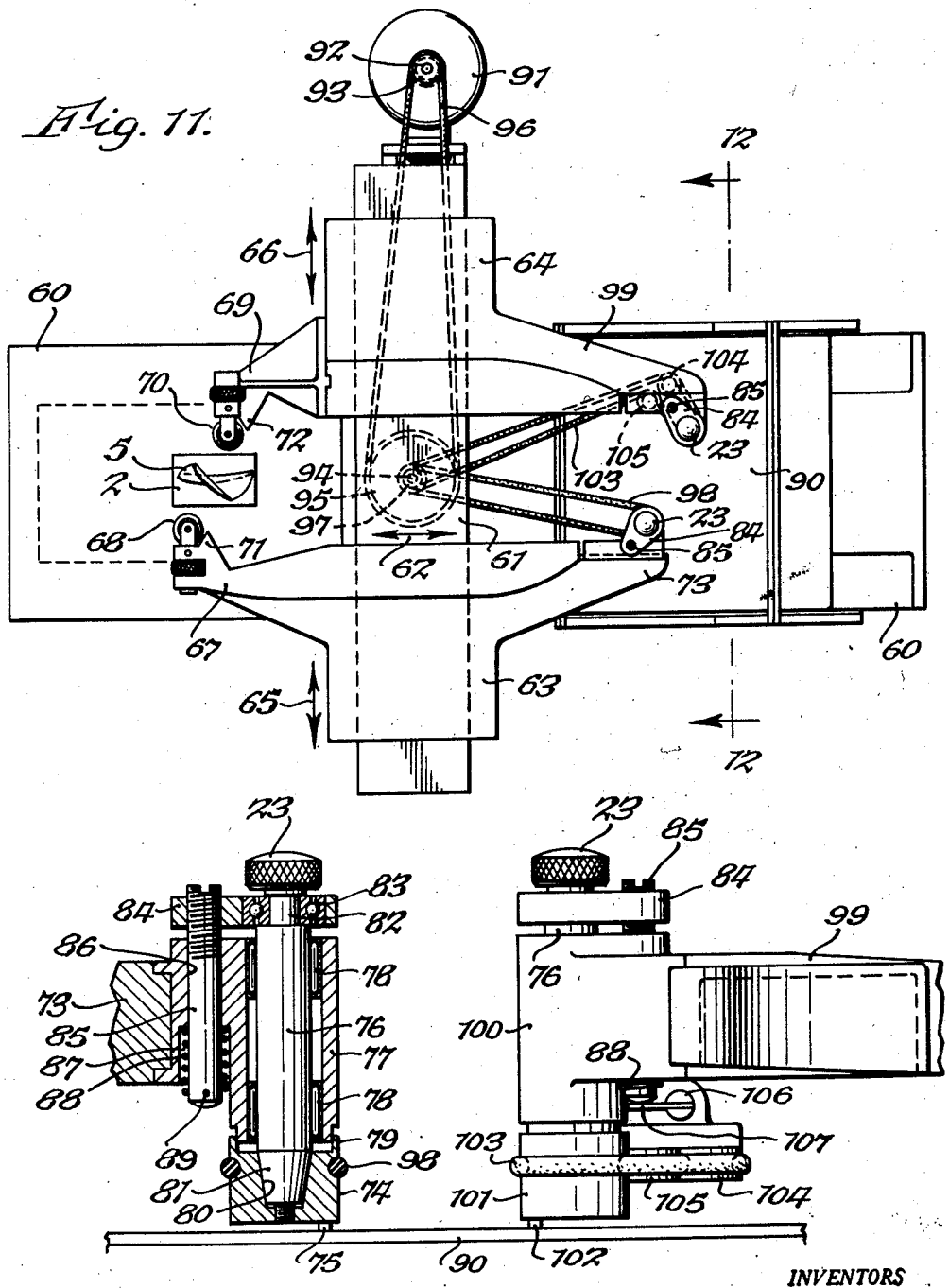

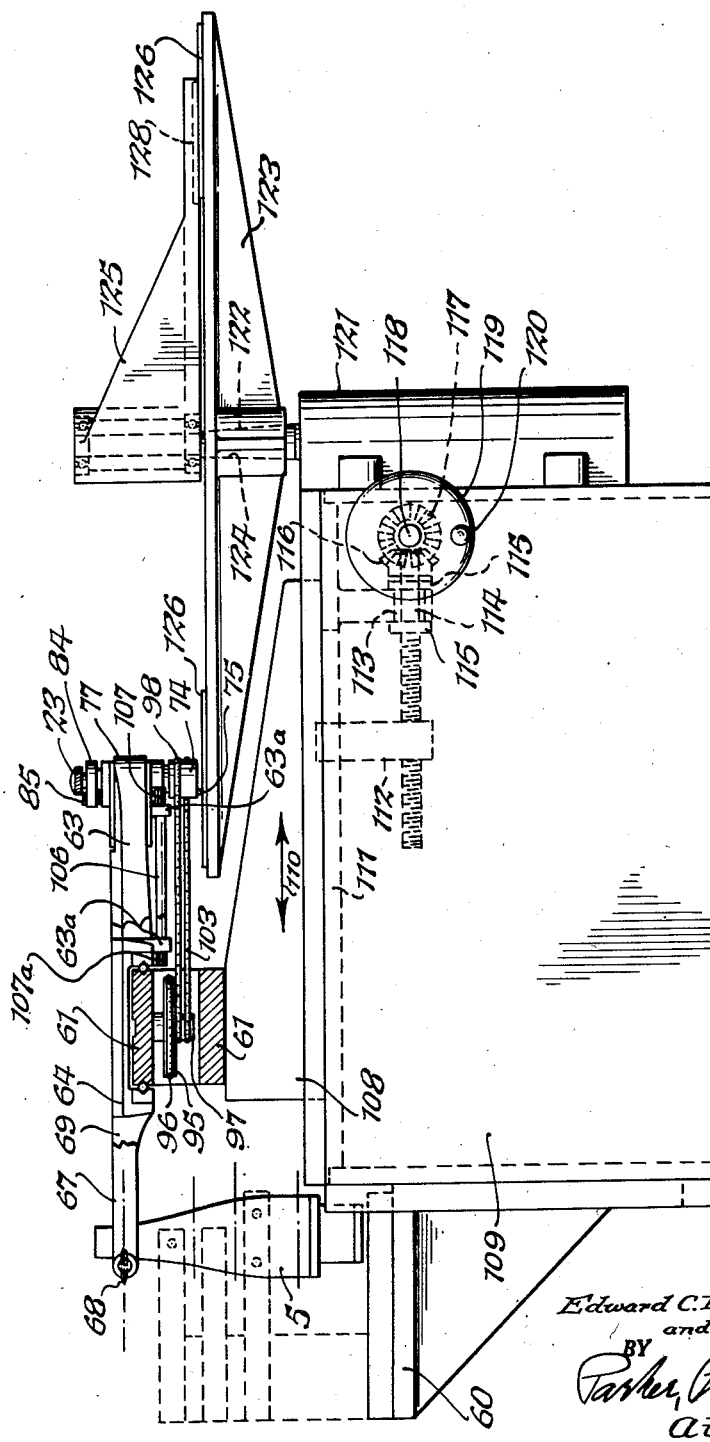

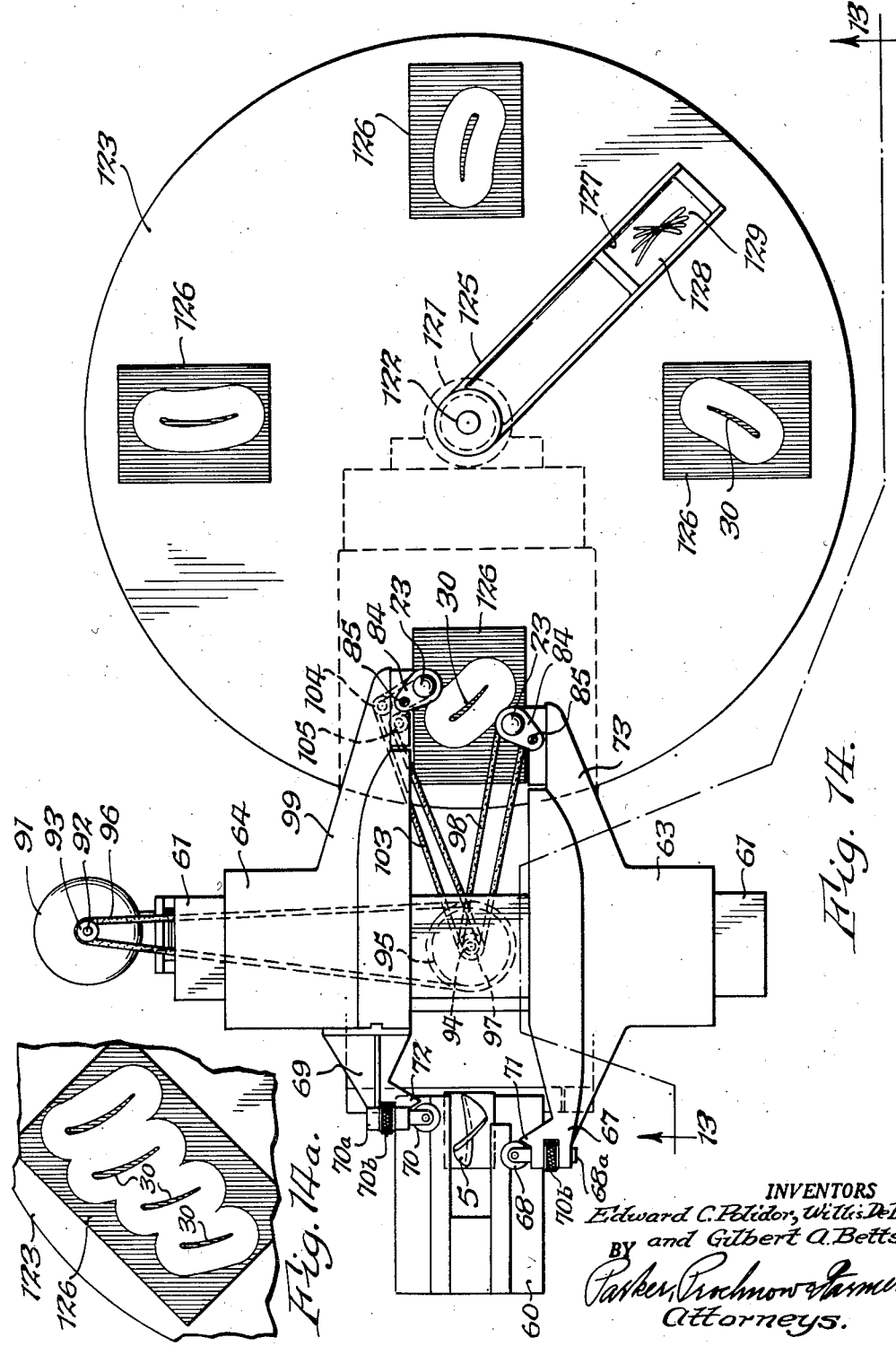

April 23, 1957  E. C. POLIDOR ET AL  2,789,354
PROFILE CONTOUR MACHINE
Filed Jan. 21, 1949  12 Sheets-Sheet 8
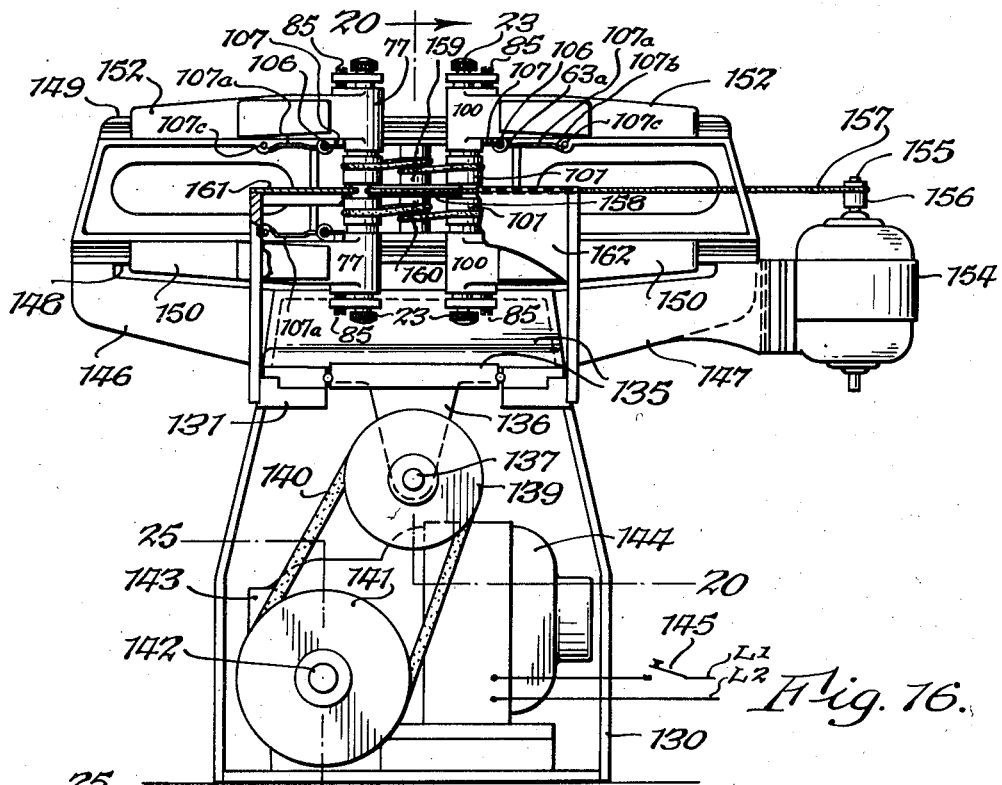
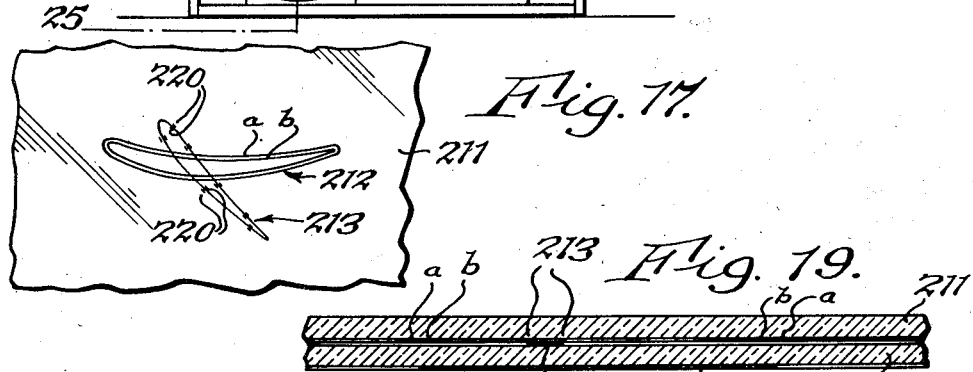
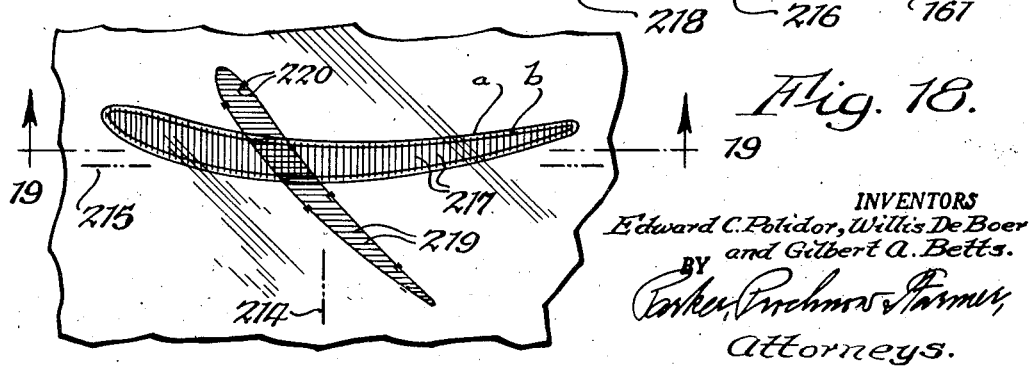
INVENTORS
Edward C. Polidor, Willis De Boer
and Gilbert A. Betts.
BY
Attorneys.

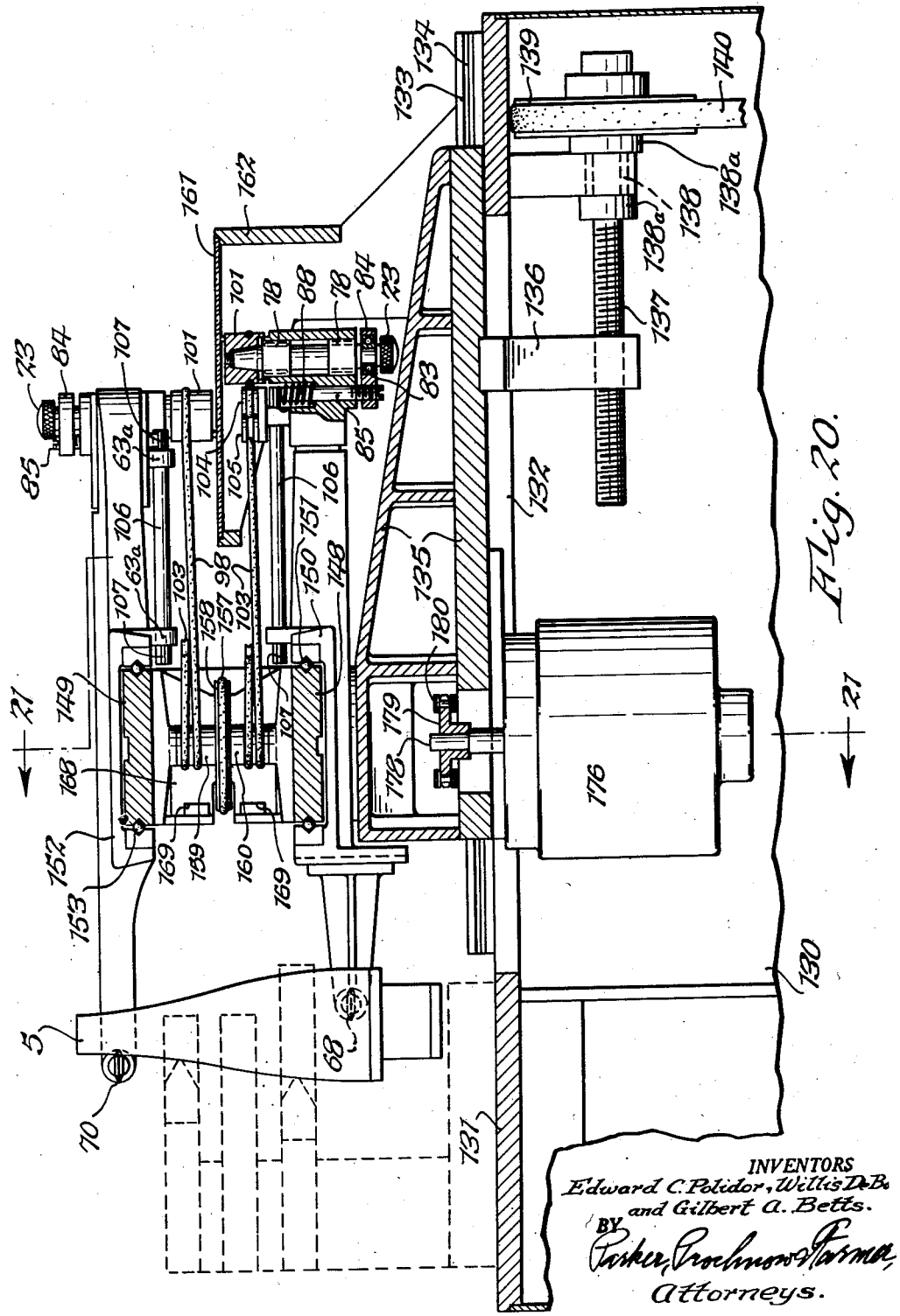

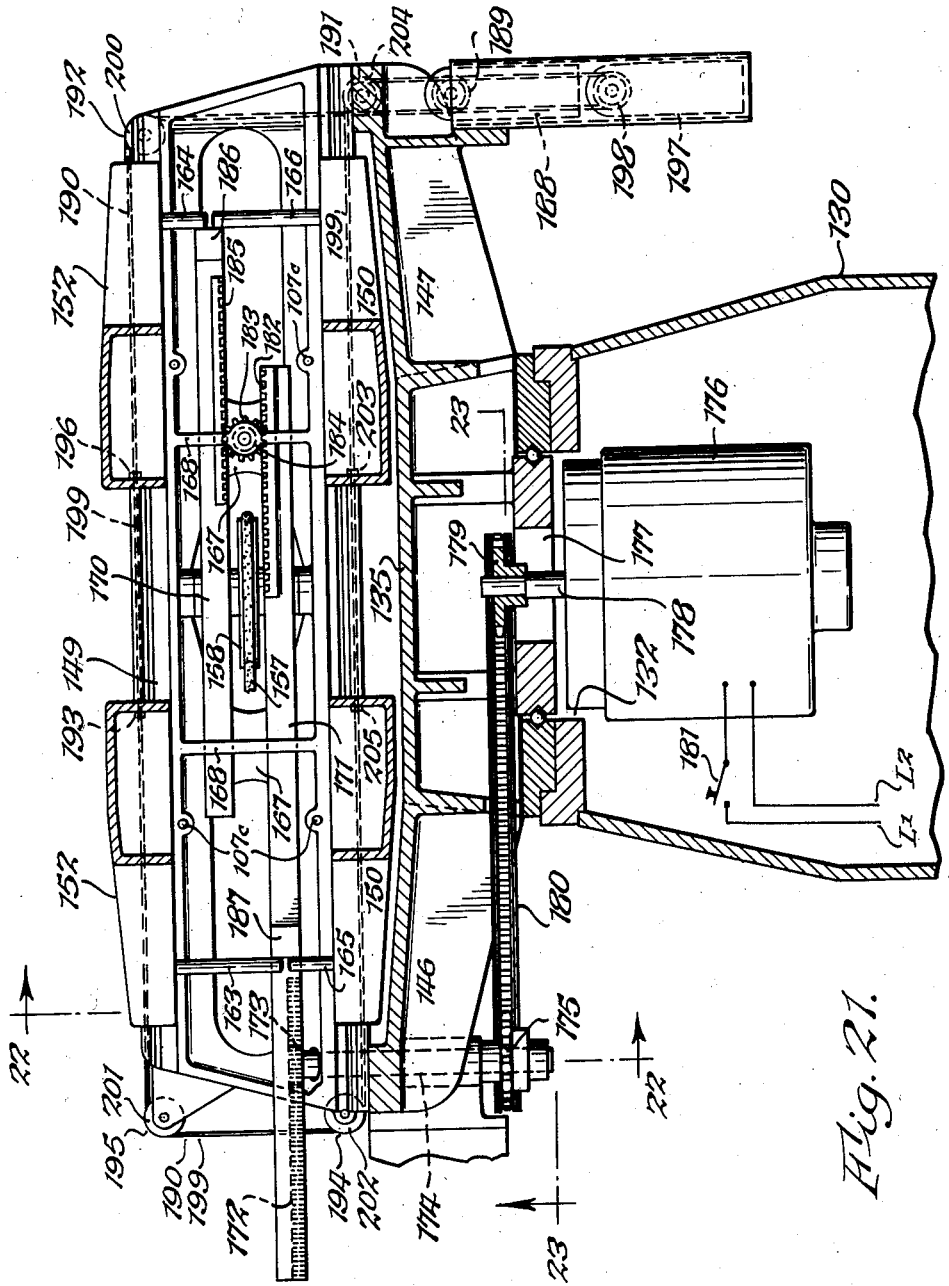

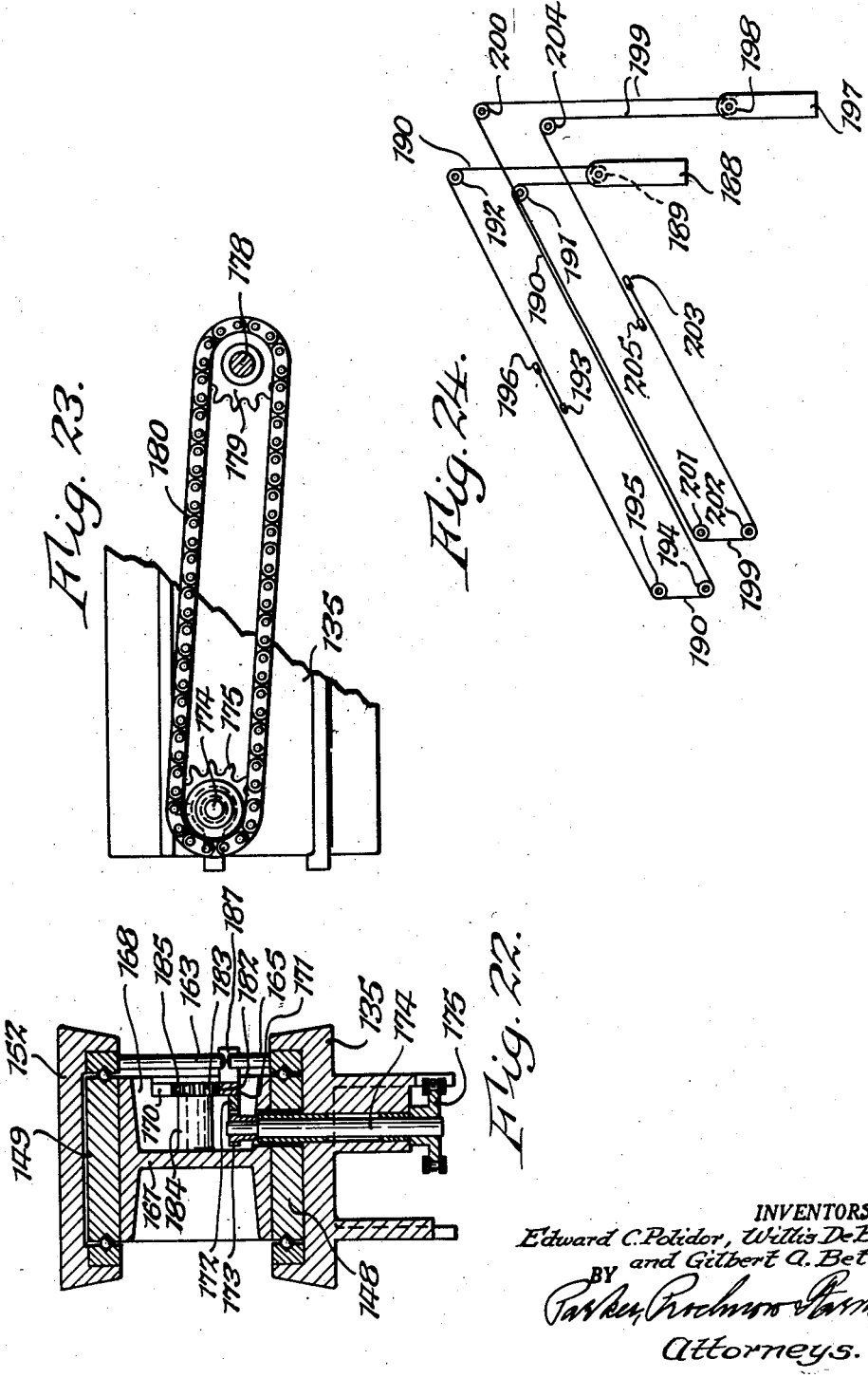

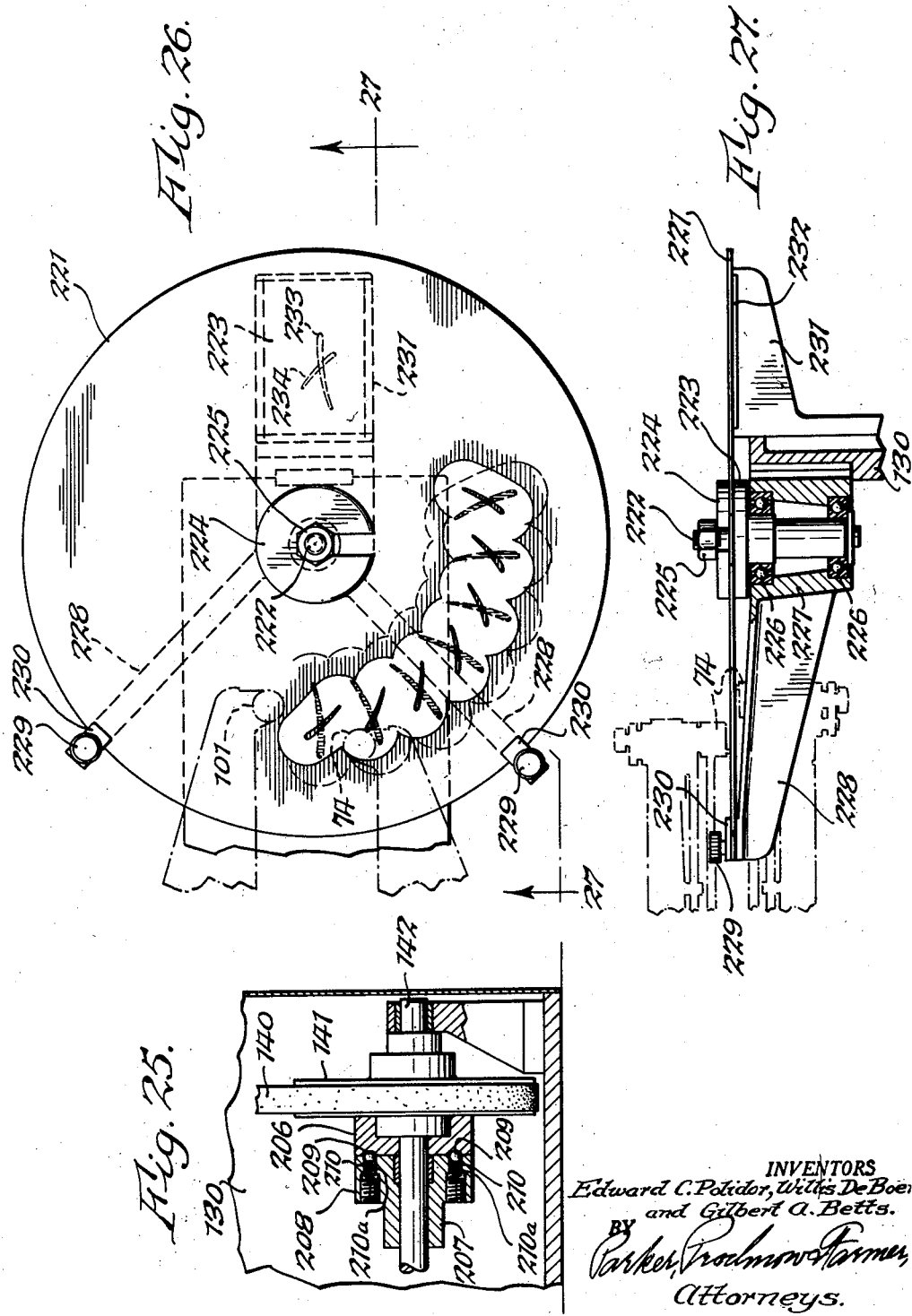

United States Patent Office 2,789,354
Patented Apr. 23, 1957

2,789,354

PROFILE CONTOUR MACHINE

Edward C. Polidor, Rochester, Willis De Boer, Williamsville, and Gilbert A. Betts, Eggertsville, N. Y., assignors, by mesne assignments, to Optical Gaging Products, Inc., Rochester, N. Y., a corporation of New York Application January 21, 1949, Serial No. 72,004

23 Claims. (Cl. 33—23)

This invention relates to the accurate checking of surfaces to determine their deviation from a selected standard. It is particularly useful in checking the accuracy of the blades of propellers, the vanes of turbines, the surfaces of dies, and various surfaces of other objects where similar problems are encountered.

An object of the invention is to provide an improved and uniform, fast, accurate, relatively simple and inexpensive method of and apparatus for inspecting and checking the accuracy of surfaces of various objects including patterns, dies, blades, vanes and their deviation, if any, from a master chart or from a former condition.

Another object is to provide a fast, accurate and simple method of and apparatus for inspecting contour profiles, thickness, width, displacement or twist relationship, and the leading and trailing edges of turbine buckets, blades, nozzle vanes, master patterns or dies.

A further object is to provide an improved method and apparatus for inspecting any accessible surface of an object to determine the variations of such surface from a standard for, or former condition of such surface; which will provide a permanent inspection record of every surface inspected; which enables comparison of similar surface portions of a plurality of objects; which enables an operator to view simultaneously the entire contour profiles of each surface gaged; which enables inspection and comparison at any desired magnification, which enables making permanent records for study or reference of surfaces of objects before and after test or regular uses thereof, or before and after various treatments of or operations on the objects; which does not require the services of highly skilled or trained operators; which employs relatively inexpensive and common optical projection devices; which may be used with either large or small objects; which makes unnecessary the use of expensive guillotine gages and which employs only simple and compact apparatus.

Various other objects and advantages will be apparent from the following description of several embodiments of the invention, and the novel features will be particularly pointed out hereinafter in connection with the appended claims.

In the accompanying drawings:

Fig. 3 is a sectional plan of a portion of the same, the section being taken approximately along the line 3—3 of Fig. 1;

Fig. 4 is an enlarged view of a portion of a glass plate with a scribing film thereon, and in which the film has been cut or drawn to define the outline of a blade section, and which is formed in the use of the apparatus shown in Figs. 1 to 3;

Fig. 5 is a sectional elevation through the plate of Fig. 4, the section being taken approximately along the line 5—5 of Fig. 4;

Fig. 6 is a plan of a master chart having marked thereon the permissible tolerances for comparison with the outline formed in the film on the plate shown in Fig. 4;

Fig. 7 is a plan of two plates superposed for comparison purposes, one carrying the master chart of Fig. 6 and the other carrying a scribed film such as that on the plate of Fig. 4, as arranged for comparison purposes in an optical magnifying device that projects magnified images of these superposed outlines;

Fig. 8 is a sectional elevation through these superposed plates, the section being taken approximately along the line 8—8 of Fig. 7;

Fig. 11 is a plan of still another embodiment of the invention, and which represents a commercial and more practical embodiment of the invention;

Fig. 12 is a sectional elevation through a portion of the same, the section being taken approximately along the line 12—12 of Fig. 11;

Fig. 13 is a side elevation, partly in section, of another machine embodying the invention, somewhat similar to that shown in Figs. 11 and 12 but employing a rotating table for carrying the plates, with scribing films, successively through scribing positions, the view corresponding to a sectional elevation taken approximately along the line 13—13 of Fig. 14;

Fig. 14 is a plan of the same;

Fig. 14a is a plan of one of the plates having a plurality of outlines defined thereon for the different sections of one blade and which may be employed on the rotating table;

Fig. 16 is a sectional elevation through part of the machine shown in Figs. 13, 14, and 15;

Fig. 17 is a plan of a master chart of transparent material, carrying superposed outlines of different sections of the same blade, with permissible tolerance variations indicated;

Fig. 18 is a plan of a superposed chart and scribed film which are to be compared by projecting images of both simultaneously on a screen;

Fig. 19 is a sectional elevation of such a master chart superposed with a scribed film, the section being taken approximately along the line 19—19 of Fig. 18;

Fig. 20 is a sectional elevation through the machine of Fig. 14, the section being taken approximately along the line 20—20 of Fig. 16;

Fig. 21 is a sectional elevation through the same, the section being taken approximately along the line 21—21 of Fig. 20;

Fig. 22 is a sectional elevation of a portion of the same, the section being taken approximately along the line 22—22 of Fig. 21;

Fig. 23 is a bottom, sectional plan of a portion of the same, the section being taken approximately along the line 23—23 of Fig. 21 and looking upwardly in the direction of the arrow;

Fig. 24 is a diagram of the cable system employed in the embodiment of Figs. 20 to 23;

Fig. 25 is a sectional elevation through a portion of the mechanism shown in Fig. 16, the section being taken approximately along the line 25—25 of Fig. 16;

Fig. 26 is a plan of a table that may be employed with the machines of Figs. 16 and 20-23; and Fig. 27 is a sectional elevation of the same, the section being taken approximately along the line 27—27 of Fig. 26.

Figure 1:
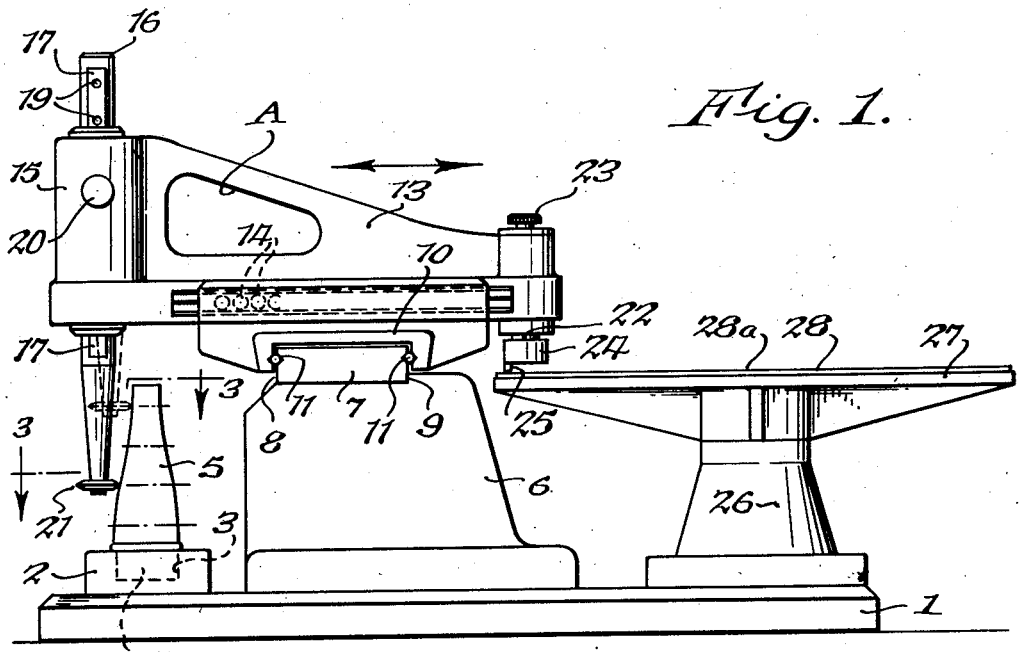
Fig. 1 is a side elevation of a simple, hand operated machine embodying the invention and illustrating the basic principles thereof.

In the embodiment of the invention illustrated in Figs. 1 to 5, the machine includes a base 1 having thereon a block 2, carrying in its upper face a recess 3 that receives and fits the base 4 of a turbine blade 5 or similar object having face or surface portions to be checked for accuracy. The blade 5 upstands from the block 2. Disposed also on the base 1 is a support 6 which carries a track bar 7 that is parallel to the base 1 and has side surfaces or edges 8 and 9. A carriage or traveler 10 is disposed over the track bar 7, and for this purpose has a channel in its lower face which fits and receives the bar 7 therewith.

Preferably ball bearings 11 are disposed between side edges 8 and 9 of the bar 7 and the sides of the recess in the under face of the carriage 10, so that the carriage 10 may ride freely and without play along the bar 7. The carriage 10 in turn is provided with a guideway 12 which is in the nature of a channel in its upper face, and slidingly mounted in this channel is an element 13. Ball bearings 14 are disposed between the sides of the guideway 12 and the element 13 so as to provide free travel of the element 13 without play. The guideway 12 is at a different level from the inverted channel which sets over the bar 7, and runs crosswise of the bar 7 so that the carriage 10 and element 13 both travel in horizontal planes at approximately right angles to each other.

The end of the element 13 nearest the blade 5 is provided with an upstanding, tubular cylindrical boss 15. Slidable vertically in the passage of boss 15 is a post 16 having a flat side face area 17 which is drilled with a row of vertically spaced holes or recesses 19. Secured in the side of boss 15 is a spring pressed plunger 20, whcih is urged yieldingly towards the passage of the boss 15 and against the side face 17. The inner end of the plunger 20 is small enough to enter into one of the recesses 19, and thus hold the post 16 in any of several vertically adjusted positions into which it may be moved. The post 16 depends well below the element 13, and at its lower end rotatably mounts a roller or follower 21, see Fig. 1, disposed along side the blade 5. By raising and lowering the post 16, the roller 21 may be disposed along any portion of the blade 5 between its ends, and this roller 21 may ride along and in contact with a surface portion of the blade, across the face thereof, as the element 13 goes back and forth along the carriage 10 and the carriage 10 goes back and forth along the bar 7.

Rotatably mounted in the other end of the element 13 is a vertically disposed shaft 22 which is spring pressed downwardly for limited vertical movement, and which at its upper end has a knurled button 23 by which the shaft 22 may be manually rotated, and which, by engagement with the element 13 limits downward movement of shaft 22. The lower end of the shaft 22 carries a head 24, on the lower end face of which is mounted a scribing tool 25 eccentrically of the rotary axis of shaft 22. This scribing tool will be carried with the element 13 back and forth in one direction and also in crosswise directions with the carriage 10, which gives the scribing tool the equivalent of a universal movement, in a plane. As the roller 21 goes across and in contact with a face of the blade 5, at any transverse section thereof, it will partake of a universal movement in a horizontal plane that is transmitted to the rotatable tool 25.

Also mounted on the base 1 is a pedestal 26, which rotatably supports a turntable 27, the axis of the turntable being vertical and the upper face of the turntable being flat. The pedestal 26 is positioned on the base with one side of a face of the turntable passing beneath the rotatable head 24. Mounted on the upper face of the turntable is a glass plate 28, having upon its upper face a scribing film 28a which is well known in the art. The scribing tool 25 rests upon the film-carrying face of the plate 28, so that as the element 13 moves in different crosswise directions while the follower 21 moves along and in contact with a face of the blade 5, the scribing tool 25 will pursue a similar path over the face of the plate 28, and will scribe in the film 28a on the plate 28 an outline of the face of the blade 5 contacted by the follower. Preferably, one manually rotates the button 23 continuously in the same direction while the roller 21 is being moved over a face of the blade 5, and this will scribe a line that somewhat resembles a helical spring that is flattened sidewise, but the edge of which corresponds to the contour of a section of the blade 5. The cutter 25 is rotated in circles while it is moved progressively, and such a line is illustrated in Fig. 14a.

The roller 24 is first moved horizontally across one face of the blade 5 while in contact with it, so as to scribe on the film a line 30 representing that surface, and then is passed along the opposite face of the blade 5 at the same section while rotating the shaft 22, and this causes a similar line 30 to be drawn or scribed on the film of plate 28 to correspond to the other face of blade 5 at the same section.

Upon completion of this operation, the plunger 20 is pulled outwardly to release the post 16, and then the post is shifted vertically, such as into the position shown by the dash lines in Fig. 1, and then the operation is repeated to scribe on the plate 28 another outline 30 corresponding to the cross section at a different portion of the blade 5. It will be understood, however, that after each outline 30 has been scribed to correspond to any cross section of the blade 5, the turntable 27 is rotated to bring a new or unmarked section of the plate 28 beneath the path of the scribing tool 25.

These blades 5 are often partially and progressively twisted along their longitudinal axis so as to have the shape shown in Fig. 3, but this is typical of only one type of such blade. The dot and dash lines crossing the blade 5 in Fig. 1 represent selected surface portions where one may desire to pass the roller 21 in order to define on the film the outlines of the cross sections of the blade at those portions.

In Figs. 4 and 5 a portion of the plate 28 is illustrated, where the circular paths of the roller 21 at different positions are shown by the dot and dash lines 21a. While the film on plate 28 will actually carry lines corresponding to the path of the rotating tool 25 while the tool is being moved linearly, the net result, if the rotation of the tool 25 is rapid enough, would be to entirely remove the film to form the clear space 29, Fig. 4, which leaves in the center of the clear space the outline 30 that corresponds to the cross section at one of the dot and dash lines on the blade 5.

In order to compare such an outline 30 with a master chart, this plate 28 is superposed over a master chart in an optical viewing or projecting device, such as projecting lanterns once known as magic lanterns and sometimes as stereopticans. Such lanterns are used frequently to project enlarged images of lantern slides that are disposed across the optical axis of a beam of light which is focused on a screen. One form of a master chart is shown in Fig. 6, and is preferably made of plate glass 32 having on a face thereof a translucent film 33 carrying thereon a diagram 34 formed of spaced equi-distant lines, one within the other. The inner one of these lines represents the minimum possible dimensions for the blade 5 at the section 30, and the outer of those lines 34 represents the maximum permissible dimensions for the same section of the blade 5. The film 33 may be a scribing film having lines 34 scribed thereon to represent the maximum and minimum dimensions of the outline 30 that are permissible, but preferably the film 33 is a sheet of thin, vellum drawing paper which is cemented over its entire face area, while taut, to the glass plate. The lines 34 may then be drawn in India ink on this drawing paper. These charts are also photographically reproduced when extreme accuracy is necessary having the lines on clear glass plates.

Figure 2:
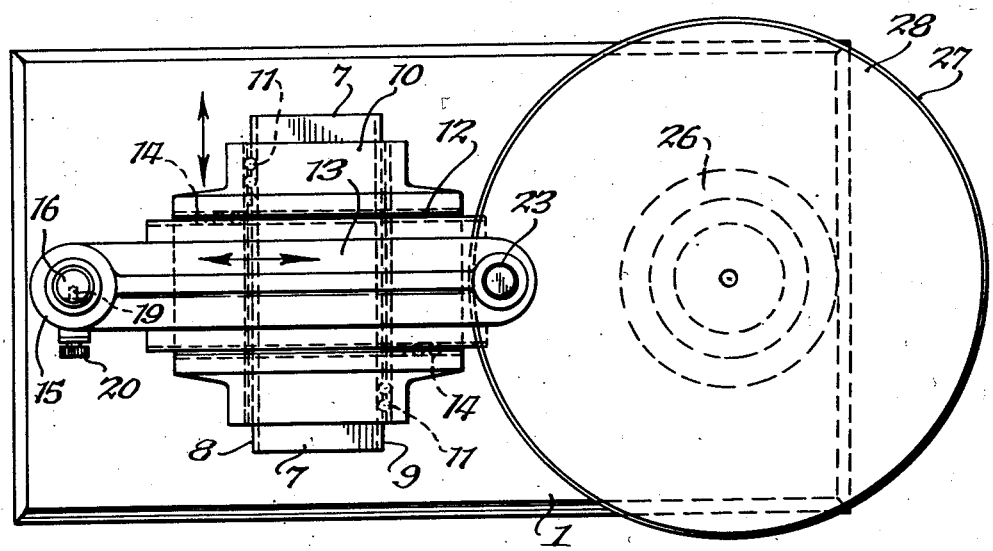
Fig. 2 is a plan of the same.

In Figs. 7 and 8 the master chart and the scribed outline film are disposed face to face in superposed relation for mounting on an optical viewing or projection device, not shown. By holding these superposed plates (the chart and scribed outline) over a light, the vertical, parallel lines 35 in Fig. 7 represent the shadow cast by the outline 30 upon the film or drawing paper 33, so that the outline of the shadow of the section represented by line 30 may be compared with the tolerance lines 34. If the margin of the shadow corresponding to the outline 30 falls everywhere between the lines 35, then one knows that the cross section of the blade at the position where the outline 30 was made, due to the movements of the roller 21 over the faces of the blade, is accurate to the desired extent. If the blade is warped from that desired, then the shadow of the outline 30 may, at one or more portions of the chart, fall outside of the tolerance lines, and one may thus know at a glance whether or not the blade is within accepted accuracy. The parts shown in Figs. 1 and 2 represent one of the very simplest forms of the invention, but the mechanism shown in Figs. 9 to 27 is more satisfactory and convenient.

Figure 9:
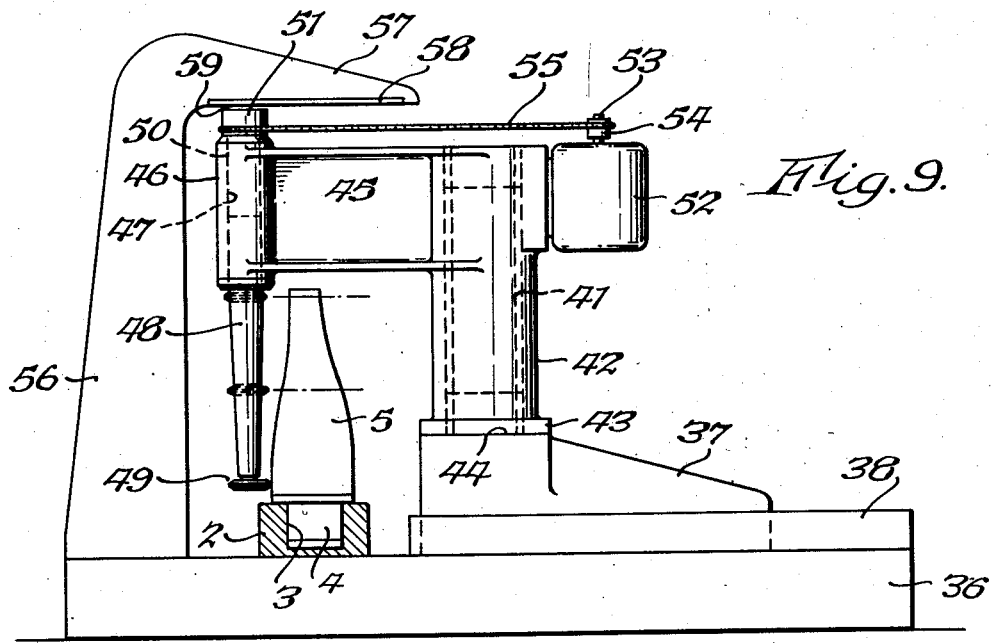
Fig. 9 is a side elevation, with a part broken away, of another embodiment of the invention.
Figure 10:
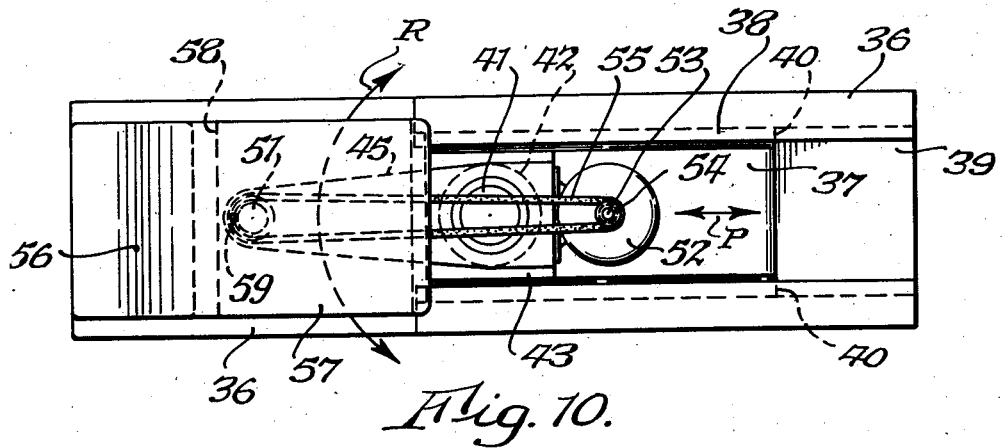
Fig. 10 is a plan of the same.

Referring next to Figs. 9 and 10, another embodiment of the invention is illustrated in which the blade 5 which is to be checked for accuracy has its base 4 received and secured in a correspondingly shaped recess 3 in block 2. This block 2 is mounted on the base 36, and the latter slidingly mounts the carriage 37 for movement toward and from the block 2. For this purpose, the base 36 is provided with spaced, parallel side guide members 38 which define between them a channel 39 in which the carriage 37 may reciprocate while being confined to the base 36. Preferably the channel 39 is undercut at the sides so as to receive in the undercut portions, flanges 40 that project from the sides of the carriage 37. Upstanding from the carriage 37 is a post 41 on which is rotatably mounted an upright sleeve 42 with a flange 43 at its lower end that rests upon a flat upper surface 44 on the carriage 37.

This sleeve 42 extends to a level above the upper end of the blade 5 and there it carries a horizontally extending arm 45. The free end of the arm 45 carries an upright, tubular boss 46 with a vertical passage 47 therethrough from top to bottom. Detachably confined in the lower end of the passage 47 is a spindle 48, which at its lower end rotatably mounts a roller or follower 49 which corresponds to the roller or follower 21 of Figs. 1 and 2. A series of these spindles 48 are provided of different lengths, so that when they are inserted in succession in the passage 47, they will depend to different lengths along the side of the blade 5. These spindles 48 may be detachably held, one at a time, in the passage 47 in any suitable manner, such as by a spring pressed plunger, such as 20, Figs. 1 and 2, or by any other means commonly employed for latching a spindle in a socket.

Disposed in the upper half of the passage 47 is a short stub shaft 50 which rises above the boss 46 and there carries a pulley 51 which is larger than the shaft, so that it rides upon the upper end of the boss 46. Mounted on the sleeve 42 at the side opposite the arm 45 is a small electric motor 52 having an upright rotating shaft 53 carrying a grooved pulley 54 at its upper end. An endless belt 55 passes along the pulleys 51 and 54 so that the motor will continuously rotate the pulley 51 as the arm 45 rocks about the post 41 as a fulcrum and the carriage 37 moves back and forth on the base 36.

Upstanding from an end of the base 36 is a column 56 which carries a horizontal arm 57 at its upper end. Secured in a recess in the underface of the arm 57, in any suitable manner, is a glass plate 58 that is provided on its lower face with a scribing film. This plate 58 is disposed over the pulley 51, as the carriage 57 is moved back and forth and the arm 45 is rocked sidewise back and forth. A scribing tool 59 is carried on the upper end face of the pulley 51, and its engagement with the film on the underface of the plate 58 will cause the scribing of a line representing the path of travel of the cutter as it rotates while moving progressively in a linear direction. With this arrangement the roller or follower 49 may be brought into contact with a face of blade 5 and moved over and in contact with that face, during which time the carriage 37 may be moved slowly toward or away from the blade in the direction of arrows P while one rocks the arm 45 in the direction of the arrows R, sufficiently to allow the follower 49 to maintain contact with the blade surface during its transit across that face of the blade.

After the follower has moved across one face of the blade, the carriage 37 is moved in the opposite direction, and the roller 49 is then caused to pass across and in contact with the opposite face of the blade 5 at the same horizontal cross section of that blade. By this arrangement the tool 59 will scribe on the film of the blade 58 a path which delineates the outline of a cross section of the blade 5 in the zone or cross sectional portion over which the follower was moved. The motor 52 makes it unnecessary for one to manually rotate the marking or scribing tool while the roller or follower 49 is moving around the blade 5. In Figs. 1 to 5 as well as in Figs. 9 and 10 the roller or follower 21 or 49 has the same diameter as the diameter of the path of rotation of the marking or scribing tool, in order that the outline defined by the tool will correspond in size to the portion of the blade 5 over which the roller moves.

In referring next to the embodiment of the invention illustrated in Figs. 11 and 12, the base 60 mounts the blade 5 in a block 2 as in Figs. 1 to 10. A carriage 61 extends crosswise of the base 60, and is mounted thereon for travel back and forth in the direction of the double-headed arrow 62. Any suitable means for slidingly mounting the carriage 61 to reciprocate toward and from the blade 5 may be employed, and since such details of carriage mounting have been disclosed in Figs. 1 and 2 and are common in machine tools, they are not illustrated in detail in Figs. 11 and 12. Slidingly mounted on the carriage 61 are two travellers 63 and 64, and they reciprocate back and forth on the carriage 61 in the direction of the double-headed arrows 65 and 66 respectively. These travellers 63 and 64 are not directly connected to each other, so that they may be independently moved back and forth.

The traveller 63 has an arm 67 which extends along a side of the blade 5 and rotatably mounts a roller 68 which acts as a follower to ride along one face of the blade 5. Similarly the traveller 64 has an arm 69 which extends past the blade 5, at the other face, but the arm 69 is somewhat shorter than the arm 67, so that as the travellers 63 and 64 travel together with the carriage 61, the free ends of the arms 67 and 69 will have one ahead of the other depending on the direction of travel. The arm 69 carries a roller or follower 70 which is adapted to ride against the other face of the blade, but the rollers 68 and 70 are in the same horizontal planes, so that they will move along opposite sides of the blade 5 at the same cross section. The travellers 63 and 64 may move independently toward and from the blade 5, so that each roller 68 or 70 may maintain contact with a face of the blade 5 while they are travelling with the carriage 61 in a direction crosswise of the length of the blade 5.

The arm 67 has a boot 71 at the side of the roller 68 towards the carriage 61, and the arm 60 has a boot or guard 72 between the roller 70 and the carriage 61. Each of these boots 71 and 72 extends towards the blade 5 at least to the axis of rotation of the roller. These boots engage with the blade as the rollers approach the blade and prevent the rollers from contacting the blade behind their centers. This makes it impossible for the rollers to be hooked around the edges of the blade during their travels.

The traveller 63 has an arm 73 extending in the opposite direction from the arm 67 and its free end mounts a pulley 74 that carries a marker or scribing tool 75 on its lower face. The pulley 74 is threaded upon a reduced threaded end of a shaft 76 which extends vertically through a tubular boss 77 provided on the free end of the arm 73. This shaft 76 may be mounted in the boss 77 by suitable needle bearings 78 that are arranged adjacent the upper and lower ends of the boss 77, within the passage therethrough, and provide a rolling low friction bearing between the shaft and the boss. The shaft 76 is free to slide endwise to a limited extent during its rotation, and the pulley 74 may have a flange 79 which telescopes over the cylindrical lower end of the boss 77, as shown in Fig. 12. The pulley 74 may have a frustoconical socket 80 which fits over a similarly shaped portion 81 of the shaft 76.

The shaft 76 at its upper end extends above the boss 77 and is there provided with an annular groove 82 in which is mounted a thrust ball bearing 83. This bearing 83 is carried in a yoke 84 which extends over the top of the boss 77 and there carries a pin 85. Pin 85 is threaded through the yoke 84 so as to extend parallel to the shaft 76 and extend to selected distances. The boss 77 is provided with a passage 86 from top to bottom through which the pin 85 slides endwise. The lower end of the passage 86 is enlarged, as at 87, so as to receive a helical spring 88 which surrounds the lower end of the pin 85. The upper end of the spring 88 abuts against the inner end of the enlarged portion 87 of the passage 86, and the other end of the spring bears against a transverse pin 89 on the pin 85. The spring 88 is under compression, so that by its reaction between the boss 77 and pin 89, it urges the pin 85 downwardly. Since the pin 85 is carried by the yoke 84, and the latter is carried on the upper end of the shaft 76, the spring 88 will urge the shaft 76 endwise and downwardly so as to carry the scribing tool 75 yieldingly against a scribing film on the upper face of a transparent plate 90. Plate 90 is carried by base 60 in a horizontal position.

Mounted on one end of the carriage 61 is an electric motor 91 which has an upright, rotating shaft 92 carrying a small grooved pulley 93 at its upper end. Mounted on the carriage 61 is a shaft 94 which extends vertically and carries on its lower face a grooved pulley 95. An endless rubber belt 96 passes around the pulley 93 on the motor and around the pulley 95. Shaft 94 is approximately midway between the ends of the carriage 61, or in direct alinement with the blade 5. The shaft 94 also carries beneath the lower face of carriage 61 two grooved pulleys 97. An endless elastic belt 98 passes around one of these pulleys 97 and around the pulley 74 so that the motor 91 through the belts 96 and 98 serve to rotate the pulley 74 and the scribing tool 75. By threading the pin 85 through the yoke or backwardly, one may limit the possible movement of the shaft 76 toward the plate 90, so that when the plate 90 is removed the cutter 75 cannot follow the plate 90 beyond a certain distance. Similarly the other traveler 64 has an arm 99 similar to the arm 73, and at its free end it carries a tubular boss 100 which is similar to boss 77.

This boss 77 rotatably mounts a shaft 76 for rotation and endwise movement in the manner shown in section at the left of Fig. 12. The shaft 76 is mounted in the same manner shown at the left in Fig. 12, including the yoke 84, the pin 85 and parts carried on the boss 100 which correspond to those carried on the boss 77, and have corresponding reference numbers. The pulley 101, which corresponds to the grooved pulley 74 has a scribing cutter 102 on its lower end face. An endless elastic belt 103 passes around the other grooved pulley 97 on the shaft 94 and around the grooved pulley 101 on the lower end of the shaft 76 of boss 100. Between the pulleys 97 and 101, the belt 103 passes around two idler pulleys 104 and 105 which are rotatably mounted on the arm 99.

Mounted in the boss 100 is a horizontally disposed shaft 106 which is rockable upon a horizontal axis below the arm 99. This shaft 106 at one end carries an arm 107 that extends beneath the lower end of the pin 85 in the boss 100. By rocking the shaft 106 the arm 107 will cam the pin 85 upwardly and lift the shaft 76 and tool 102. A similar shaft and arm are provided beneath the pin 85 and boss 77 so that pin 85 on arm 73 also may be elevated to lift the tool 75 from contact with the plate 90.

The elasticity of the endless belts 98 and 103, and the acute angles of their travel relatively to the double headed arrows 62, will tend to pull the travellers 63 and 64 toward each other with a yielding force so that the rollers or followers 68 and 70 will be urged into contact with the opposite faces of the blade 5, and maintain that contact as the rollers roll across the opposite faces of the blade 5. The rollers 68 and 70 have the same diameter as the paths of travel of the tools 75 and 102, and the tools 75 and 102 will, while rotating continuously, pursue paths over the film-carrying face of plate 90 corresponding to the opposite faces of the blade 5 with which the rollers 68 and 70 contact. These tools 75 and 102 will thus delineate on the film on plate 90 an outline which has the shape and size of the cross section of the blade 5 where traversed by the rollers 68 and 70.

In operating this mechanism, the blade 5 is mounted on the base 60, the parts are brought into the positions shown in Figs. 11 and 12, but with both rollers 68 and 70 beyond one vertical edge of the blade 5, which would be to the left of the blade 5 in Fig. 11. The travellers 63 and 64 are drawn toward each other by the elasticity and angles of the belts 98 and 103, so that the rollers 68 and 70 may slightly overtravel or pass as the travellers 63 and 64 move toward each other. With the motor 91 running, the carriage 61 is moved to the right in Fig. 11. During such movement the roller 70 will first engage with an edge of blade 5, and then pass along and in contact with one face of the blade. Shortly after the engagement of roller 70 with one face of the blade 5, the roller 68 will also engage with the same edge of the blade in the same cross section, and move along the opposite face of the blade 5 at the same cross section, and in trailing relation to the roller 70.

The travellers 63 and 64 will be resiliently urged toward each other to keep the rollers 68 and 70 in contact with opposite faces of the blade 5, and the tools 75 and 100 will be given paths corresponding to the paths of the rollers 68 and 70 and will scribe those paths on the upper face of plate 90. The boots 71 and 72 will prevent the roller from being hooked around the first edge of the blade 5 to be engaged, serve to cam the rollers away from the blade until they approach it properly. The pins 85 will be kept elevated, by operation of shaft 106, while the rollers are brought towards the first edge of the blade 5, and then are released so that the tools 75 and 102 will engage with the film on plate 90 during the travel of the carriage while the rollers 68 and 70 are in contact with the blade 5.

Figure 15:
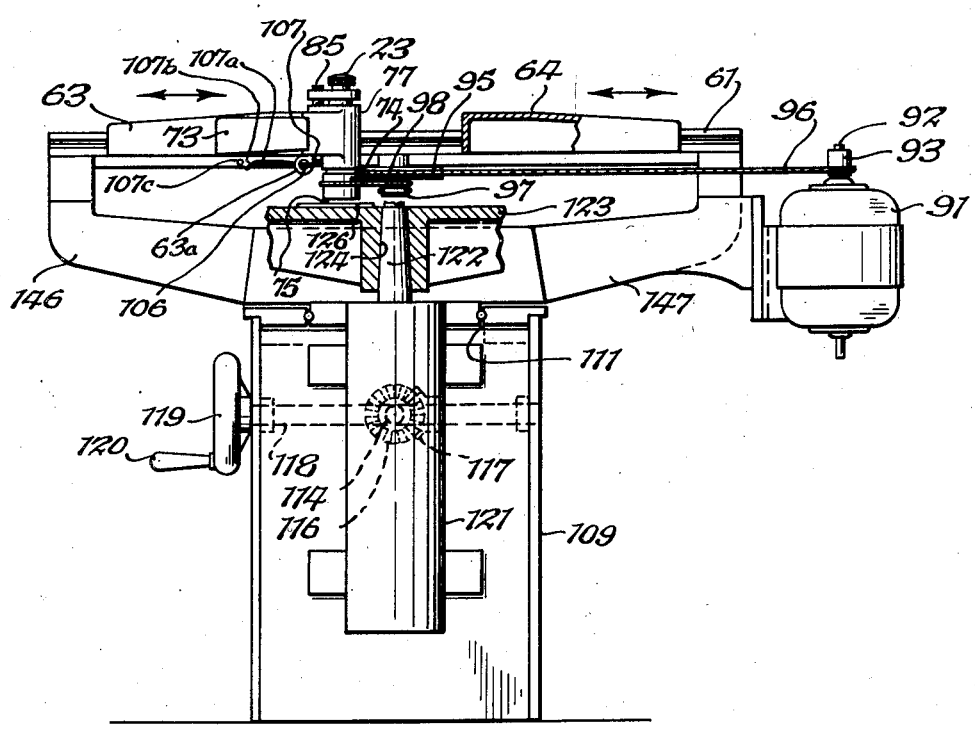
Fig. 15 is an end elevation of the same, partly in section.

In the embodiment of the invention illustrated in Figs. 13, 14 and 15, the construction is generally similar to that shown in Figs. 11 and 12 except that blade 5 is mounted in a fixture on its support 60 and that the mechanism is provided to mechanically move the platform 108 back and forth on the base 109, toward and from the blade 5; also the fixed support for the film carrying glass plate is replaced by a turn table, so that a series of scribing plates may be moved in succession through scribing position. Since the scribing mechanism and blade support are generally similar to corresponding parts in Figs. 11 and 12, such corresponding parts have corresponding reference characters. In this embodiment of the invention as shown in Figs. 13-15, the carriage 61 is mounted on the platform 108 which is mounted on the box-like base 109 for movement back and forth in the direction of a double headed arrow 110, through suitable guideways provided on the base 109.

The top of the base 109 has a longitudinally extending slot 111, Figs. 13 and 15, and the platform 108 is provided with a depending post 112, Fig. 13, that extends downwardly through slot 111 into the base 109. The base 109 is provided in its interior with a split bearing 113 that rotatably supports a shaft 114, and this shaft has integral collars 115 at the ends of the bearing which restrain endwise movement of the shaft 114 without inhibiting its rotary movement. The shaft 114 extends in a direction parallel to the direction of movement of the platform 118, and is threaded through a passage in the depending post 112, so that when the shaft is rotated, the post 112 will act as a nut and be moved slowly in one direction or other, depending on the direction of rotation of the shaft 114. Fixed on the other end of the shaft 114 is a bevel gear 116 which meshes with and is driven by a bevel gear 117 that is fixed on a shaft 118 that extends at right angles to the shaft 114 through the front of the box-like base 119.

On its exterior end the shaft 118 carries a hand wheel 119 having an operating handle 120 so that by turning the hand wheel 119, one may cause the platform 108 to move in either direction at a relatively slow rate of speed. This replaces the direct manual operation of the carriage 61 in Figs. 11 and 12.

The base 109, at the end remote from the upstanding blade 5, has a bearing boss 121 which rotatably supports an upright turntable shaft 122. The upper end of this shaft 122 is upwardly convergent, Fig. 15, and a turntable 123 has a tapered passage 124 at its center which fits over this upwardly convergent section of the shaft 122, so as to form a driving connection between them, yet permit lifting of the turntable separately from the shaft 122. The shaft 122 above the turntable, Fig. 13, is cylindrical, with a diameter equal to or smaller than the smaller end of the tapered portion, and rotatably mounted on this cylindrical upper end is a master chart holder 125, which is in the nature of an arm that extends radially from the shaft 122 and sweeps over the upper face of the turntable, slightly above the same. Detachably secured on the upper face of the turntable are a series of glass plates 126, Fig. 14, which move successively through scribing position beneath the pair of rotating tools 75 and 102.

The holder 125, at its free end, is provided with an aperture 127 which may be successively alined with the plates 126, as the turntable moves the plates 126 beneath the arm 125, or the holder 125 may be rotated about the shaft 122. A transparent master chart 128, Fig. 14, is secured on the arm 125 across the aperture 127, and therefore one may bring the master chart 128 over the outline in any plate 126 that is away from scribing position. The chart 128 carries thereon a series of diagrams 129 corresponding to the different cross sections of the blade 5 whose outlines are to be defined on the plates 126 in succession. The followers 68 and 70 may also be mounted in the forked ends of rods 68a and 70a that are rotatably mounted in arms 67 and 69 respectively. Nuts 70b are confined in the arms 67 and 69 and threaded on rods 68a and 70a so that by turning the nuts 70b one may shift the followers 68 and 70 toward and from the blade 5.

In the embodiment of the invention illustrated in Figs. 16 and 20–23 inclusive, provision is made to simultaneously scribe the outlines of different cross sections of the upstanding blade at the same time upon films provided on opposite faces of a glass or other transparent plate. In this embodiment of the invention, the upstanding blade 5 is mounted on the base at one end thereof in the manner explained in the preceding figures. The base is a box-like element 130 having a platform or support 131, Fig. 20, at one end, on which the blade 5 is mounted. The base 130 also has a slot 132 in its top wall which is similar to the slot 111 of Fig. 13. Mounted on the upper face of the top wall of the base 130 are opposed guides 133 having undercut grooves 134 between which is received and guided the travelling platform 135 which corresponds to the platform 108 of Fig. 13.

Platform 135 has a depending lug 136 passing downwardly through the slot 132 and it is threaded over the threaded end of a shaft 137 which is rotatably mounted in a split bearing 138 that depends from the top of the base and rotatably supports the shaft 137 in the same manner that the bearing 113 supported the shaft 114 in Fig. 13. Collars 138a on shaft 137 engage with the ends of the bearing 138 and prevent endwise movement of the shaft in the bearing. Thus, the means of moving the platform 135 back and forth between the guides 133 is similar to that provided in Figs. 13, 14 and 15, except that instead of the bevel gears for rotating the shaft 137, the bevel gear 116 of Fig. 13 is replaced by a pulley 139, Fig. 20 which is fixed on the shaft and which is driven by an endless belt 140 that also passes around a pulley 141, see Fig. 16. The pulley 141 is fixed on a shaft 142 which is driven through a safety clutch shown in Fig. 25 and suitable reduction gearing contained in a housing 143, from an electric motor 144. The motor 144 is connected to line wires L' and L² with a switch 145 in the line wire L'.

The platform 135 is provided with laterally extending arms 146 and 147, Fig. 16, that are turned upwardly at their free ends and support a pair of plate-like bridges 148 and 149, Fig. 20 that are arranged in superposed, vertically spaced relation. A traveller 150 is disposed beneath the bridge 148, and provided with a recess in its upper face which receives the bridge 148. Ball bearings 151 are provided between the side edges of the bridge 148 and the traveller 150 which confine the traveller 150 to the bridge while guiding it in movements in directions from end to end of that bridge. Similarly, a traveller 152 is disposed above the bridge 149 and is provided in its lower face with a recess that embraces the side edges of the bridge 149, with the bridge in the recess. Ball bearings 153 are disposed between the side edges of the bridge 149 and the side walls of the recess in traveller 152, so as to confine that traveller to that bridge and guide it in movements lengthwise along that bridge in directions from end to end thereof.

There are two travellers 150 on the bridge 148, and two travellers 152 on the bridge 149. The two travellers on each bridge correspond to the travellers 63 and 64 on a common bridge or carriage 61 of Figs. 11 and 12, and each of these travellers mounts at one end the roller or follower, as in Figs. 11 and 12, and at its other end the scribing tool. Each tool is mounted in the manner explained for the tools 75 and 102 of Figs. 11 and 12, except that here the scribing tools and their mounts are inverted on the traveller 150 because the scribing tools on the travellers 150 will be upstanding. Parts corresponding to those in Figs. 11 and 12 have corresponding reference numerals.

The arm 147, Fig. 16, at its free end also mounts an electric motor 154 which is disposed with its driving shaft 155 vertical, and with a grooved pulley 156 on the upper end of this shaft. An endless elastic belt 157 passes around the pulley 156 and also around a pulley 158. The pulley 158 is disposed approximately horizontally and provided with an upstanding hub 159 and a depending hub 160, both of which have separate peripheral grooves to serve as small pulleys. The ends of these hubs 159 and 160 are rotatably supported by a depending bearing from the bridge 149, and an upstanding bearing from the bridge 148. The grooves in the hub 159 act as driving pulleys that correspond to the pulleys 97 of Figs. 11 and 12, and drive the belts 98 and 103, Fig. 20, that rotate pulleys 74 and 101 that carry scribing tools, as in Figs. 11 and 12. These scribing tools 75 and 102 are yieldingly urged toward the glass plate 161, Fig. 20, which is supported on an upstanding structure 162 provided on the base 130. This plate 161 has a scribing film on each of its faces.

Similarly the grooves in the hub 160 also correspond to the pulleys 97 of Figs. 11 and 12, and drive endless belts 98 and 103 that also drive the pulleys 74 and 101 as in Figs. 11 and 12, except that these pulleys 84 and 101 are now upstanding since the scribing units on the end of travellers 150 are inverted from those shown in Figs. 11 and 12, as well as those shown on the travellers 152 on the bridge 149. With this arrangement, the outline corresponding to one section of the upstanding blade 5 may be scribed in the film on the upper face of plate 161 at the same time that the cross section of another part of the blade 5 is scribed on the underface of the same plate 161.

One of the travellers 162, Fig. 21, is provided with a long depending pin 163 and the other traveller 152 with a shorter depending pin 164, both at the same side of the bridge 149. One of the travellers 150 is provided with a short upstanding pin 165, which is arranged end to end with the pin 163, when the superposed travellers 150 and 152 at that side of the machine are in superposed alined relation. Similarly, the other traveller 150 at the opposite side of the machine is provided with a long upstanding pin 166, which is in end to end arrangement with the pin 164 of the traveller 152 that is immediately above and alined with it. The bridges 148 and 149, intermediate their ends, are connected by webs 167, see Figs. 21 and 22, which have ribs 168, Fig. 21, extending from their faces and crosswise of the bridges. Each of these ribs 168 is provided with an aperture 169, Fig. 20, in which are slidingly supported two rack bars 170 and 171 that extend in directions lengthwise of the bridges. The apertures 169, Fig. 20, in each rib are vertically spaced. The lower rack bar 171, Fig. 21, is provided on a face thereof with rack teeth 172, Fig. 22, which mesh with a pinion 173 fixed on the upper end of a vertical shaft 174 which is rotatably mounted in the platform 135.

On the lower end of the shaft 174 is fixed a sprocket wheel 175. Also supported on the platform 135, Fig. 21, is a slow speed electric motor 176 with its armature shaft upstanding and projecting upwardly through an aperture 177 in the platform 135. The upper end of the motor is received within the slot 132 in the top wall of the base 130, so that the motor may travel endwise with the platform 135. Fixed upon the upper end of the armature shaft 178 is a sprocket wheel 179, and an endless chain 180 passes around both sprocket wheels 175 and 179 so as to provide a driving connection between the motor 176 and the pinion 173 that meshes with the rack bar 171. The motor 176 is supplied with current from line wires L' and L², and a suitable switch 181 in line wire L' makes it possible to start and stop the motor as desired.

The rack bar 171 is provided at the end opposite the rack teeth 172 with rack teeth 182 in its upper edge, which mesh with an idler gear or pinion 183, Figs. 21 and 22, which is rotatably supported in a boss-like enlargement 184 in one of the ribs 68. The pinion or gear 183 also meshes with rack teeth 185 provided in the lower edge of the rack bar 170, so that when the lower rack bar 171 is operated endwise through the drive connection from the motor 176, the upper rack bar 170 will be given an equal movement in the opposite direction. The rack bar 170 at one end is provided with a lug 186 which is disposed to engage with both of the pins 164 and 166 and push them horizontally away from the center of the machine when the rack bar 171 is moved to the left in Fig. 21.

The lower rack bar 171 is also provided with a lug 187 which engages with and pushes the pins 163 and 165 when the rack bar 171 is moved to the left in Fig. 21, so as to carry the pins 163 and 165 to the left at the same time that the lug 186 on the upper rack bar is carrying the pins 164 and 166 to the right in Fig. 21. Since the pins 163, 164, 165 and 166 are carried by the travellers, it follows that the lug 187 in moving to the left in Fig. 21 will carry the left-hand superposed travellers 150 and 152 outwardly away from the center of the machine, at the same time that the lug 186 through its engagement with the pins 164 and 166 moves the other pair of superposed travellers 150 and 152 to the right in Fig. 21, which would be away from the center of the machine. This separation of the travellers 152 from each other, and the travellers 150 from each other, serves to carry the followers on those travellers away from the object, such as the blade 5, of which the scribing will be made.

To move the travellers 152 toward each other, a system of cables operated by a weight is provided. Referring first to Fig. 24, a suitable weight 188 has a pulley 189 at its upper end around which passes a cable 190. This weight 188 is disposed at one side of the machine, which is at the right in Fig. 21, and the cable passes over a pair of pulleys 191 and 192 provided at different levels on the same side of the platform 135, such as at the corresponding ends of the bridges 148 and 149. That stretch of the cable 190 which passes over the upper pulley 192 then passes along the upper bridge 149, and its end 193 is coupled to the traveller 152 which is at the left in Fig. 21. The other stretch of the cable 190, which passes over the roller 191, passes along the lower bridge 148 to the opposite end of the bridge there around a pulley 194, upwardly and over a roller 195, and then toward the right hand side of the bridge in Fig. 21, where at 196 it is coupled to the traveller 152 which is at the right in Fig. 21. The pull on the ends of the cable 190 caused by the weight 188 is effective to pull the travellers 152 toward each other and thus carry one pair of the followers or rollers toward the object or blade 5 from opposite sides.

Similarly another weight 197, Fig. 24, is also provided adjacent the weight 188, and at its upper end is provided with pulley 198 around which passes another cable 199. One stretch of the cable 199 passes upwardly over a pulley 200 at one end of the upper bridge 149, then along the upper bridge to the opposite end of the bridge where it passes around a pulley 201 which is horizontally alined with the pulley 195, then it passes downwardly to the adjacent end of the lower bridge 148 where it passes around another pulley 202 carried on that end of the lower bridge, then towards the opposite end of that bridge where it terminates in a fastening 203 where it is coupled to the traveller 150 which is at the right in Fig. 21. The other stretch of the cable 199 passes around a pulley 204 provided at the adjacent end of the lower bridge 148, then horizontally along that bridge and terminates in a fastener 205 which is coupled to the traveller 150 which is at the left in Fig. 21.

From the diagram in Fig. 24 it will be observed that the weight 197 similarly pulls toward each other the travellers 150. When the motor 176, Fig. 21, is de-energized, the weights 188 and 197 are free to urge toward each other the upper travellers 152, and the lower travellers 150. When this happens, the pins 163, 164, 165 and 166 will push the rack bars 170 and 171 in opposite directions and slowly rotate the motor 176 in opposite direction which serves as a slight brake to retard the approach of the traveller 152 and of the traveller 150.

Referring next to Figs. 16, 20 and 25, the pulley 141 is loose on the shaft 142 and fixed to one face of the pulley 141, Fig. 25, is a boss 206. Fixed on the shaft 142 is a sleeve 207 which has a head 208 that abuts endwise against the free or outer end face of the boss 206. Secured in the end face of the head 208 which abuts against the boss 206, are clutch balls 209 which are provided in recesses 210 in the head 208 and pressed by springs 210a in an outward direction so as to project slightly beyond the end face of the head 208 and against the abutting end face of the boss 206. The outer end of each recess 210 is slightly restricted so that the balls 209 cannot be fully ejected from the recess. The boss 206 is provided in its free end face with cavities or recesses into which the balls 209 are projected so as to provide a yieldable driving coupling between the shaft 142 and the pulley 141. This serves as a safety clutch which prevents injury to the motor if endwise movement of the platform is prevented at any time.

It has been observed that with the apparatus of Figs. 16 and 20–25, one may simultaneously scribe different outlines on the films on opposite faces of the plate 161, Fig. 20, and the manner in which such a double coated plate 161 is employed is illustrated in Figs. 17 to 19. After the outlines corresponding to the different cross sections of the blade 5 have been formed in the films of plate 161, that plate 161 is removed from the machine and disposed beneath a master chart 211 which is similar to the master chart illustrated and described in Figs. 5 and 6. The master chart has its face carrying the diagrams or outlines 212 and 213 abutting against a face of the plate 161, as shown in Fig. 19, and the master chart and one of the films on plate 161 have "set" lines 214 and 215, see Fig. 18, which should be brought into register when the master chart 211 is superposed on the plate 161. That is, the marks 214 on the chart 211 and plate 161 should be brought into register and also the other lines 215 on the chart 211 and the plate 161 also should be brought into register.

If these superposed chart and plate are placed across a beam of light the outline 216 of one face of the plate 161, which represents the actual outline of one cross section of the blade 5, will cast a shadow represented by the vertical shade lines 217 in Fig. 18, which will be in an approximate alinement with the outline markings 212 on the master chart. The markings 212 are spaced lines representing the maximum and minimum possible sizes for the cross section represented in outline by the outline 216, in the film of plate 161, and if the margin of the shadow cast by the outline 216 falls entirely between the two lines $a$ and $b$, Fig. 17, then one knows that the actual cross section of the blade 5 represented by the outline 216 is accurate within permissible tolerances.

Similarly, the outline 218 on the other face of plate 161 and which represents the shape of another cross section of the blade 5, will cast a shadow approximately coinciding with the outline 213 on the chart 211, this shadow being represented by the horizontal shade lines 219 in Fig. 18. While the chart 213 may have continuous, equally spaced lines, as in the chart 212, to represent the tolerance variations, this outline 213, as shown, represents another manner in which the tolerance limits may be indicated. In this example the outline 213 represents the desired, accurate outline of the section of the blade represented by the scribed outline 218 on plate 161, and the tolerance limits along this outline 213 are shown as spaced parallel lines 220 on opposite sides of the continuous line. If the shadow cast by the outline 218 approximately conforms to the outline 213 on the chart and does not deviate therefrom in either direction further than the lines 220, then one knows by a glance that the blade section represented by the outline 218 is accurate within permissible tolerances.

Referring next to Figs. 26 and 27, a slight modification of machine illustrated in Figs. 16 and 20–25 is illustrated in which the plate 161 is replaced by a circular glass plate 221 which is mounted on the upper end of an upright spindle 222. This spindle has a head or collar 223 against which the plate 221 rests, the plate 221 having an aperture which fits over the upper end of the spindle 222. A split washer 224 is disposed on the spindle 222, and rests against the upper face of the plate 221. A nut 225, threaded upon the upper end of the spindle 222, clamps the washer 224 against the plate 211 and confines the latter against the collar or head 223. The spindle 222 is rotatably supported by ball bearings 226 in a supporting frame 227 which is carried by the base 130.

Two arms 228 radiate from the frame 227 to the periphery of the disk or plate 221 and there carry screws 229. These screws 229 confine short flat strips 230 against the upper face of the peripheral marginal edge of the plate 221. By tightening the screws 229, the plate 221 and the spindle 222 may be confined against rotation. The portion of the plate 221 at one side of the spindle 222 extends beneath the upper scribing cutters, and above the lower scribing cutters, in the position occupied by the plate 161 in Fig. 20. This plate or disk 221 is provided with scribing films on its upper and lower faces, and thus one may scribe on those faces the outlines of two cross sections of the blade 5 simultaneously, and after one pair of outlines have been formed thereon, as shown in Fig. 26, one replaces the blade with another and scribes the outlines of its similar sections on the films of plate 221, merely by rotating the disk 221, step by step through small increments after each scribing, so that the cross sections of successive blades will be arranged in sequence on the disk 221.

The base 130 also carries beneath the edge of disk or plate 211, Figs. 26 and 27, at the side remote from the scribing position, a support 231 for a master chart 232 carrying outlines 233 and 234 representing the proper shapes of the sections of the blades that are scribed on the opposite faces of the plate 21. As the disk 221 is rotated step by step, the scribed outlines may be brought, in succession, beneath this master chart, and inspected, and thus one master chart serves as a convenient reference for a series of outlines of successive blades.

It is believed that the operation of the device will be clear from the foregoing description, but will be briefly summarized. In the simple machine illustrated in Figs. 1 and 2, the blade 5 is mounted in an upright position, and the glass plate 28 with the scribing film on its upper face is mounted on the turntable 27. The operator grasps the element 13, which may have an aperture A therein to serve as a handle, and moves the element to engage the roller or follower 21 with a face of the blade and then across that face while keeping the roller 21 in contact with that face. Then the roller is similarly moved in the opposite direction along the opposite face of that blade. During this movement, the operator also with the other hand, grasps the knurled button 23 and turns it continuously, which rotates the head 24 and its scribing tool 25, so that the tool will mark in the film a line representing circular and linear paths of movement combined, and the tangent to these paths defines an outline of the exact size and shape as the cross section of the blade 5 around which the roller 21 was moved.

The operator then shifts the post 16 vertically to another section of the blade 15, which one desires to measure, and the turntable 27 is also rotated to bring a fresh portion of the film 28 beneath the scribing tool 25. The same operation is repeated, and in the same manner another outline is formed representing the other cross section of the blade. Such an outline is shown in Fig. 4, and then a master chart shown in Fig. 6 is superposed on the outline shown in Fig. 4, as shown in Fig. 8. Then, when the superposed plates are disposed across a beam of light, the outline 30 of Fig. 4, which represents the cross section of the blade, will project a shadow on the master chart, as shown in Fig. 7, which enables one to determine at a glance whether or not the cross section of the blade is accurate within permissible tolerances.

It will be understood of course that both the plate 28 and master chart have suitable set lines B and C which should be brought into register as a guide when superposing the chart and film-carrying plate. If the beam of light is that of an optical system, that magnifies the shadow and the shadow is cast upon an optical screen and accurate comparison can be quickly made.

In the embodiment of the invention illustrated in Figs. 9 and 10, an improvement over the hand operation is provided, in that the motor 52 acting through the belt 55 continuously rotates the scribing tool that marks its lines on the film provided on the underface of the glass plate 58. In this instance there is only one sliding mounting, which is between the carriage 37 and the base 36, and the scribing tool and follower are both mounted on a pivoted arm 45. The rocking of the arm 45 allows the roller 49 to follow the surface of the blade as it progresses across the face of the blade.

In the embodiments of the invention illustrated in Figs. 11 and 12, also 13 and 14, provision is made to move followers over both faces of the blade in a single operation of the carriage or platform, so that by a single movement of the carriage 6, Figs. 11 and 12, or platform 108, to the right in Figs. 11 and 12, both halves of the outline representing the cross section of the blade engaged by the followers will be formed on the scribing film. The travellers are urged toward each other by the elasticity of the belts that rotate the scribing tools.

In Figs. 11 and 12 there are two travellers 63 and 64 mounted on a single carriage, so that the travellers may approach each other and recede while the carriage is travelling in a straight line path, which would be to the right in Fig. 11. The rollers or followers 68 and 70 successively engage with opposite faces of the blade and travel across them, and these followers are kept in contact with the plate faces by reason of the elasticity and angles of the belts 98 and 103 which drive the scribing cutters, and which are driven from the common motor 91 continuously. The rotating scribing tools or markers are yieldingly pressed against the film or record sheet carrying plate 90 by the springs 88, yet the cutters may be lifted from contact with the plate while moving the carriage into a position to start the contact of the roller 70 with the blade 5. The travellers 63 and 64 will thus be held in contact with the blade 5 as the carriage 61 moves to the right in Fig. 11, so that the pair of scribing tools will successively define the outline representing a cross section of the blade 5.

In Figs. 13 and 14, the platform 108, which corresponds to the carriage 61, is moved progressively to the right (Figs. 13 and 14), by merely turning the hand wheel 119. This embodiment also illustrates the mounting of successive plates on a common turntable so that they may be brought successively into scribing positions, and also illustrates how the master chart can be mounted above the turntable so that it can be brought over any scribed plate for comparison of the scribed outline with the outline provided on the chart.

In Figs. 16 and 20–25, a more involved machine is illustrated, which simultaneously scribes the outlines of two cross sections of the blade at the same time on films provided on opposite sides of a glass plate, and the platform may be shifted by a motor instead of a hand operation. In this embodiment the travellers are separated by the use of a slow speed motor, and are urged in directions to keep their followers in contact with the plate by weights and cable systems shown in Fig. 24.

In Figs. 26 and 27 the machine is similar to that just described except that a circular disk or glass plate having films on its opposite faces is moved step by step through scribing position, and then through viewing position over a master chart.

In the embodiment illustrated in Figs. 11 and 12, the shaft 106 was provided with an arm 107 that engaged beneath each pin 85 so as to withdraw the scribing tool from contact with the film-carrying plate, when one desired to move the tools over the surface of the plate or shift the plate to a new position. In Fig. 13, this shaft 106 is illustrated as extending along its related traveller towards the carriage 61. Bearings 63a may be provided on each traveller to support the shaft 106, and adjacent the carriage 61 the shaft 106 carries an arm 107a (Fig. 15 also) which may be engaged with a cam when the traveller has been moved away from scribing position on the carriage. This is illustrated in Figs. 15 and 16, where it will be observed that the arm 107a extends parallel to the direction of travel of the traveller for a substantial distance, and at its end is bent laterally at an acute angle to form a cam surface 107b.

Provided on the carriage or platform is a pin 107c. When the travellers are separated a distance beyond the zone where there is desired contact with the scribing plate, the cam ends 107b are cammed aside by the pins 107c and the pins 107c have relative movement along the lengths of the arm 107a to hold them in the same locked position as the traveller moves along the bridge or support. When any pin 107c locks the arm 107a, it serves to retract by its arm 107 the related scribing tool, so that holding the arm 107a by pin 107c in the rocked position serves to keep the scribing tool out of contact with the film until the scribing tool returns approximately to the position where a roller or follower is about to engage the blade. When the arm 107a is released from pin 107c, the spring 88 associated with each shaft 76 that carries a tool, will urge the tool into engagement with the film on the scribing plate.

It will be understood that various changes in the details and arrangements of parts, which have been herein described and illustrated in order to explain the nature of the invention, may be made by those skilled in the art within the principal and scope of the invention, as expressed in the appended claims.

We claim:

1. In the method of comparing the profile contour of a selected portion of an object with a master chart of said portion and carrying thereon markings indicating permissible deviations therefrom, that improvement relating to the preparation of an outline of said surface for optical comparison with said chart, which comprises simultaneously rolling roller followers entirely across and in contact with opposite meeting faces of said object portion in the same transverse plane, with one follower leading the other, and the paths of the followers crossing at opposite sides of said object, and simultaneously recording in the same order on a film, lines corresponding to the relative paths of said followers in the same relationship to each other and positions as said paths and similarly crossing.

2. In the method of comparing the profile contour of a selected portion of an object with a master chart of said portion and carrying thereon markings indicating permissible deviations therefrom, that improvement relating to the preparation of an outline of said surface for optical comparison with said chart, which comprises simultaneously moving followers entirely across and in contact with opposite meeting faces of said object portion in the same transverse plane, with one follower leading the other, and the paths of the followers crossing at opposite sides of said object, and simultaneously scribing circular lines of the same diameters as said followers in the same order in a film on a light transmitting plate that correspond in relative positions to the relative, crossing paths of said followers.

3. In the method of comparing the profile contour of a selected portion of an object with a master chart of said portion and carrying thereon markings indicating permissible deviations therefrom, that improvement relating to the preparation of an outline of said surface for optical comparison with said chart, which comprises simultaneously moving followers entirely across and in contact with opposite meeting faces of said object portion in the same transverse plane, with one follower leading the other, and the paths of the followers crossing at opposite sides of said object, and simultaneously recording on a film, in the same order and positions, lines corresponding to the successive positions of the followers in their relative paths and similarly crossing.

4. In the method of comparing the profile contour of a selected portion of an object with a master chart of said portion and carrying thereon markings indicating permissible deviations therefrom, that improvement relating to the preparation of an outline of said surface for optical comparison with said chart, which comprises simultaneously moving followers entirely across and in contact with opposite meeting faces of said object portion in the same transverse plane, with one follower leading the other, and the paths of the followers crossing at opposite sides of said object, and simultaneously recording on a film, in the same order, lines corresponding to the successive positions of the followers in their relative paths and similarly crossing.

5. In the method of comparing the profile contour of a selected portion of an object with a master chart of that portion, that improvement relating to the preparation of an outline of said surface for optical comparison with said chart, which comprises rolling individual rollers simultaneously entirely across and in contact with opposite meeting faces of said object portion in the same transverse plane, with one roller leading the other and the paths of the rollers crossing at opposite sides of said object, rotating a pair of scribing elements about axes eccentric to them, with radii of rotation equal to the radii of said rollers, simultaneously moving the rotating elements bodily in paths corresponding to the paths of travel of said rollers in contact with said faces and causing contact of said elements with a scribing film on a transparent plate to cause said elements to delineate on said film, between the margins of the successive lines made by the moving tools, an outline representing in full size the transverse cross section of said object at said plane.

6. A device for use in comparing the profile contour of a surface portion of an object with a master chart for that surface portion which comprises a supporting for detachably mounting said object, a traveller mounted on said support for travel in a direction toward and from said object and which is in a plane transverse to said surface portion, a pair of elements mounted on said traveller for movement independently of each other in directions crosswise of said travel of said traveller but in a plane parallel to said transverse plane, a follower carried by each element and engaging with said object at opposite sides thereof at said surface portion, and riding across and in contact with said surface portion at opposite sides of said object as said traveller moves on said support, one follower having a lead over the other in said traveller movements, a scribing tool carried by each element at a substantial distance from the follower of that element, said tools having the same lead relation to each other as said followers, a plate having a scribing film engaged by said tools during their movements with the elements while the followers are in contact with said surface portion, whereby lines corresponding to said surface portion contour in transverse cross section will be scribed on said film, and said film with the scribed lines may be magnified by optical projection for comparison with said master chart at the same magnification.

7. A device for use in optically comparing the profile contour of a surface portion of an object with a master chart for that contour, which comprises a base for detachably mounting said object, a carriage mounted on said base for reciprocation thereon in opposite directions in a plane generally transverse to said surface, a pair of travellers mounted on said carriage for reciprocation thereon in directions crosswise of said opposite directions and in a plane parallel to said first plane, a follower on each traveller, one to engage with and progress over and in contact with one face of said object at said portion, and the other to engage with and progress over and in contact with the opposite face of said object at said portion, a marker carried by each traveller for movement therewith, a record sheet across and in contact with which said markers engage and make records as followers move across and in contact with said faces of said object, to define on the sheet an outline representing accurately the cross section of said object at said surface portion, and a member simultaneously urging said travellers yieldingly towards each other on said carriage and towards the opposite faces of said object at said surface portion.

8. A device for use in optically comparing the profile contour of a surface portion of an object with a master chart for that contour, which comprises a base for detachably mounting said object, a carriage mounted on said base for reciprocation thereon in opposite directions in a plane generally transverse to said surface, a pair of travellers mounted on said carriage for reciprocation thereon in directions crosswise of said opposite directions and in a plane parallel to said first plane, a follower on each traveller, one to engage with and progress over and in contact with one face of said object at said portion, and the other to engage with and progress over and in contact with the opposite face of said object at said portion, a marker carried by each traveller for movement therewith, a record sheet across and in contact with which said markers engage and make records as said followers move across and in contact with said faces of said object, to define on the sheet an outline representing accurately the complete cross section of said object at said surface portion, a member simultaneously urging said travellers yieldingly towards each other on said carriage and towards the opposite faces of said object at said surface portion, and means acting between said travellers for forcing them apart against the action of said yieldingly urging member and then releasing them to approach each other.

9. A device for optically comparing the profile contour of a surface portion of an object with a master chart for that contour, which comprises a base for detachably mounting said object with said surface of the object projecting from the base, a carriage mounted on said base for movement in opposite directions in a plane generally transverse to said surface, a pair of travellers mounted on said carriage for movement back and forth in directions crosswise of said opposite directions and parallel to said first plane, a roller follower on each traveller for movement across and in contact with a face of said surface, one follower moving over one face of said surface and the other over the other face of that surface, a rotary scriber with an eccentric marking tool rotatably mounted on each traveller for bodily movement therewith while rotating thereon, a motor, driving connections from said motor to each scriber for rotating it as its traveller moves back and forth and as it moves with said carriage, each scriber having a radius of rotation of its marking tool equal to the radius of rotation of the follower on that traveller, and a light transmitting record element having a scribing film on a face thereof, disposed for engagement by the marking tools of said scribers, said follower and scriber on one traveller being advanced farther than those of the other traveller in the direction of movement of said carriage, said followers being disposed opposite faces of said object at the same transverse cross section.

10. A device for optically comparing the profile contour of a surface portion of an object with a master chart for that contour, which comprises a base for detachably mounting said object with said surface of the object projecting from the base, a carriage mounted on said base for movement in opposite directions in a plane generally transverse to said surface, a pair of travellers mounted on said carriage for movement back and forth in directions crosswise of said opposite directions and parallel to said first plane, a roller follower on each traveller for movement across and in contact with a face of said surface, one follower moving over one face of said surface and the other over the other face of that surface, a rotary scriber with an eccentric marking tool rotatably mounted on each traveller for bodily movement therewith while rotating thereon, a motor, driving connections from said motor to each scriber for rotating it as its traveller moves back and forth and as it moves with said carriage, each scriber having a radius of rotation of its marking tool equal to the radius of rotation of the follower on that traveller, and a light transmitting record element having a scribing film on a face thereof, disposed for engagement by the marking tools of said scribers, said follower and scriber on one traveller being advanced farther than those of the other traveller in the direction of movement of said carriage, said followers being disposed opposite faces of said object at the same transverse cross section, said travellers being yieldingly urged toward each other to move into engagement with said opposite faces of said object at the same cross section.

11. A device for optically comparing the profile contour of a surface portion of an object with a master chart for that contour, which comprises a base for detachably mounting said object with said surface of the object projecting from the base, a carriage mounted on said base for movement in opposite directions in a plane generally transverse to said surface, a pair of travellers mounted on said carriage for movement back and forth in directions crosswise of said opposite directions and parallel to said first plane, a roller follower on each traveller for movement across and in contact with a face of said surface, one follower moving over one face of said surface and the other over the other face of that surface, a rotary scriber with an eccentric marking tool rotatably mounted on each traveller for bodily movement therewith while rotating thereon, a motor, driving connections from said motor to each scriber for rotating it as its traveller moves back and forth and as it moves with said carriage, each scriber having a radius of rotation of its marking tool equal to the radius of rotation of the follower on that traveller, a light transmitting record element having a scribing film on a face thereof, disposed for engagement by the marking tools of said scribers, said follower and scriber on one traveller being advanced farther than those of the other traveller in the direction of movement of said carriage, said followers being disposed opposite faces of said object at the same transverse cross section, a platform mounting a plurality of said record elements in a row, and a support for said platform for movement to carry said elements successively into recording positions in engagement with the scribers.

12. A device for optically comparing the profile contour of a surface portion of an object with a master chart for that contour, which comprises a base for detachably mounting said object with said surface of the object projecting from the base, a carriage mounted on said base for movement in opposite directions in a plane generally transverse to said surface, a pair of travellers mounted on said carriage for movement back and forth in directions crosswise of said opposite directions and parallel to said first plane, a roller follower on each traveller for movement across and in contact with a face of said surface, one follower moving over one face of said surface and the other over the other face of that surface, a rotary scriber with an eccentric marking tool rotatably mounted on each traveller for bodily movement therewith while rotating thereon, a motor, driving connections from said motor to each scriber for rotating it as its traveller moves back and forth and as it moves with said carriage, each scriber having a radius of rotation of its marking tool equal to the radius of rotation of the follower on that traveller, a light transmitting record element having a scribing film on a face thereof, disposed for engagement by the marking tools of said scribers, said follower and scriber on one traveller being advanced farther than those of the other traveller in the direction of movement of said carriage, said followers being disposed opposite faces of said object at the same transverse cross section, and a support for said element, movable to carry successive film portions through recording positions in contact with said scribers, whereby records of different sections can be recorded in successive positions on said element.

13. A device for optically comparing the profile contour of a surface portion of an object with a master chart for that contour, which comprises a base for detachably mounting said object with said surface of the object projecting from the base, a carriage mounted on said base for movement in opposite directions in a plane generally transverse to said surface, a pair of travellers mounted on said carriage for movement back and forth in directions crosswise of said opposite directions and parallel to said first plane, a roller follower on each traveller for movement across and in contact with a face of said surface, one follower moving over one face of said surface and the other over the other face of that surface, a rotary scriber with an eccentric marking tool rotatably mounted on each traveller for bodily movement therewith while rotating thereon, a motor, driving connections from said motor to each scriber for rotating it as its traveller moves back and forth as it moves with said carriage, each scriber having a radius of rotation of its marking tool equal to the radius of rotation of the follower on that traveller, a light transmitting record element having a scribing film on a face thereof, disposed for engagement by the marking tools of said scribers, said follower and scriber on one traveller being advanced farther than those of the other traveller in the direction of movement of said carriage, said followers being disposed opposite faces of said object at the same transverse cross section, a support for said element, movable to carry successive film portions through recording positions in contact with said scribers, whereby records of different sections can be recorded in successive positions on said element, and a generally transparent master chart disposed along the path of travel of said records to place the records successively in superposed relation to the master chart for optical comparison therewith.

14. A device for optically comparing the profile contour of a surface portion of an object with a master chart for that contour, which comprises a base for detachably mounting said object with said surface of the object projecting from the base, a carriage mounted on said base for movement in opposite directions in a plane generally transverse to said surface, a pair of travellers mounted on said carriage for movement back and forth in directions crosswise of said opposite directions and parallel to said first plane, a roller follower on each traveller for movement across and in contact with a face of said surface, one follower moving over one face of said surface and the other over the other face of that surface, a rotary scriber with an eccentric marking tool rotatably mounted on each traveller for bodily movement therewith while rotating thereon, a motor, driving connections from said motor to each scriber for rotating it as its traveller moves back and forth and as it moves with said carriage, each scriber having a radius of rotation of its marking tool equal to the radius of rotation of the follower on that traveller, and a light transmitting record element having a scribing film on a face thereof, disposed for engagement by the marking tools of said scribers, said follower and scriber on one traveller being advanced farther than those of the other traveller in the direction of movement of said carriage, said followers being disposed opposite faces of said object at the same transverse cross section, each scriber being individually movable lengthwise of its axis to a limited extent into and out of engagement with said element.

15. A device for optically comparing the profile contour of a surface portion of an object with a master chart for that contour, which comprises a base for detachably mounting said object with said surface of the object projecting from the base, a carriage mounted on said base for movement in opposite directions in a plane generally transverse to said surface, a pair of travellers mounted on said carriage for movement back and forth in directions crosswise of said opposite directions and parallel to said first plane, a roller follower on each traveller for movement across and in contact with a face of said surface, one follower moving over one face of said surface and the other over the other face of that surface, a rotary scriber with an eccentric marking tool rotatably mounted on each traveller for bodily movement therewith while rotating thereon, a motor, driving connections from said motor to each scriber for rotating it as its traveller moves back and forth and as it moves with said carriage, each scriber having a radius of rotation of its marking tool equal to the radius of rotation of the follower on that traveller, and a light transmitting record element having a scribing film on a face thereof, disposed for engagement by the marking tools of said scribers, said follower and scriber on one traveller being advanced farther than those of the other traveller in the direction of movement of said carriage, said followers being disposed opposite faces of said object at the same transverse cross section, each scriber being individually movable lengthwise of its axis to a limited extent into and out of engagement with said element, and resiliently urged into engagement with said element.

16. A device for optically comparing the profile contour of a surface portion of an object with a master chart for that contour, which comprises a base for detachably mounting said object with said surface of the object projecting from the base, a carriage mounted on said base for movement in opposite directions in a plane generally transverse to said surface, a pair of travellers mounted on said carriage for movement back and forth in directions crosswise of said opposite directions and parallel to said first plane, a roller follower on each traveller for movement across and in contact with a face of said surface, one follower moving over one face of said surface and the other over the other face of that surface, a rotary scriber with an eccentric marking tool rotatably mounted on each traveller for bodily movement therewith while rotating thereon, a motor, a rotary driving member at approximately mid-position in the direction of approach of said travellers and operated by said motor, elastic belt driving connections from said driving member to each scriber to rotate the latter in all positions of movement of the travellers, and exerting a pull on the travellers to urge them resiliently toward each other, each scriber having a radius of rotation of its marking tool equal to the radius of rotation of the follower on that traveller, and a light transmitting record element having a scribing film on a face thereof, disposed for engagement by the marking tools of said scribers, said follower and scriber on one traveller being advanced farther than those of the other traveller in the direction of movement of said carriage, said followers being disposed opposite faces of said object at the same transverse cross section.

17. A device for optically comparing the profile contour of a surface portion of an object with a master chart for that contour, which comprises a base for detachably mounting said object with said surface of the object projecting from the base, a carriage mounted on said base for movement in opposite directions in a plane generally transverse to said surface, a pair of travellers mounted on said carriage, for movement back and forth in directions crosswise of said opposite directions and parallel to said first plane, a roller follower on each traveller for movement across and in contact with a face of said surface, one follower moving over one face of said surface and the other over the other face of that surface, a rotary scriber with an eccentric marking tool rotatably mounted on each traveller for bodily movement therewith while rotating thereon, a motor, a rotary driving member at approximately mid-position in the direction of approach of said travellers and operated by said motor, said motor and driving member being mounted on said carriage for travel therewith, elastic belt driving connections from said driving member to each scriber to rotate the latter in all positions of movement of the travellers, and exerting a pull on the travellers to urge them resiliently toward each other, each scriber having a radius of rotation of its marking tool equal to the radius of rotation of the follower on that traveller, and a light transmitting record element having a scribing film on a face thereof, disposed for engagement by the marking tools of said scribers, said follower and scriber on one traveller being advanced farther than those of the other traveller in the direction of movement of said carriage, said followers being disposed opposite faces of said object at the same transverse cross section.

18. A device for use in optically comparing the profile contour of a surface portion of an object with a master chart for that contour, which comprises a base for detachably mounting said object, a carriage mounted on said base for reciprocation thereon in opposite directions in a plane generally transverse to said surface, a pair of travellers mounted on said carriage for reciprocation thereon in directions crosswise of said opposite directions and in a plane parallel to said first plane, a roller follower on each traveller, one to engage with and progress over and in contact with one face of said object at said portion, and the other to engage with and progress over and in contact with the opposite face of said object at said portion, a rotatable marker carried by each traveller for movement therewith and having a marker point eccentric to its axis of rotation and extending endwise from the marker and a diameter of rotation equal to the diameter of the follower, a record sheet across and in contact with which said markers engage and make records as said followers move across and in contact with said faces of said object, to define on the sheet an outline representing accurately the cross section of said object at said surface portion, a member simultaneously urging said travellers yieldingly towards each other on said carriage and towards the opposite faces of said object at said surface portion, and motor means on said carriage having a driving connection to the markers for rotating both continuously as they move with the travellers.

19. In the method of comparing the profile contour of a selected portion of an object with a master chart of said portion and carrying thereon markings indicating permissible deviations therefrom, that improvement which comprises simultaneously rolling roller followers entirely across and in contact with opposite faces of said object portion in the same transverse plane, with one follower leading the other, and the paths of the followers crossing at opposite sides of said object, and simultaneously recording on a film, in the same sequence and order as the travel of said followers, lines corresponding to the relative paths of said followers and similarly crossing.

20. In the method of comparing the profile contour of a selected portion of an object with a master chart of said portion and carrying thereon markings indicating permissible deviations therefrom, that improvement which comprises simultaneously moving followers entirely across and in contact with opposite faces of said object portion in the same transverse plane, with one follower leading the other, and the paths of the followers crossing at opposite sides of said object, and simultaneously scribing lines in a film on a light transmitting plate that correspond in size and relative positions to the relative crossing paths of said followers.

21. In the method of comparing the profile contour of a selected portion of an object with a master chart of that portion, that improvement which comprises passing individual rollers simultaneously entirely across and in contact with opposite faces of said object portions and in the same transverse plane, with one roller leading the other and the paths of the rollers crossing at opposite sides of said object, simultaneously moving rotating scribing elements in corresponding paths, and with the same lead and order with the radii of rotation of the scribing elements equal to the radii of the corresponding rollers, and causing contact of said elements with a scribing film on a transparent plate to cause said elements to delineate on said film an outline representing the transverse cross section of said object at said plane.

22. A device for use in comparing the profile contour of a surface portion of an object with a master chart for that portion, which comprises a support for said object, a traveler mounted on said support for rectilinear travel in one direction toward and from said object, a member mounted on said traveler to move rectilinearly thereon in a direction crosswise of the movement of the traveler, a roller follower carried by said member to roll its periphery across and in contact with said surface portion as said traveler and member move, a scriber point mounted on said member remote from said follower for rotation about an axis eccentric to it with a radius of rotation of the point equal to the radius of the follower periphery, a plate having a film against which the scriber point is pressed so as to receive a scribed record therein of the movement of said point, means yieldingly and resiliently urging said point endwise against said plate, and means for continuously rotating the scriber point during its movement with said member.

23. A device for use in comparing the profile contour of a surface portion of an object with a master chart for that portion, which comprises a support for said object, a pair of followers, means mounting said followers and guiding them to move across and in contact with different surface portions of the object at the same time, means yieldingly urging each follower against a surface portion of the object independently of the other follower while moving across a surface portion of the object, a scribing point moving with each follower in an identical path with the points extending endwise toward each other, a plate disposed between the scribing points and engaged thereby on opposite faces at the same line, and means resiliently urging said points against said plate, whereby markings corresponding to said surface portions will be recorded at the same time on opposite faces of said plate.

References Cited in the file of this patent

UNITED STATES PATENTS

| Number | Name | Date |
|---|---|---|
| 219,813 | Haley | Sept. 23, 1879 |
| 752,617 | De Pue | Feb. 16, 1904 |
| 935,728 | Arp et al. | Oct. 5, 1909 |
| 1,542,582 | Raiche | June 16, 1925 |
| 2,020,185 | Hoe | Nov. 5, 1935 |
| 2,066,999 | Neufeld | Jan. 5, 1937 |
| 2,093,203 | Miller | Sept. 14, 1937 |
| 2,136,134 | Holley | Nov. 8, 1938 |
| 2,192,529 | Thomas et al. | Mar. 5, 1940 |
| 2,198,716 | Ackerman et al. | Apr. 30, 1940 |
| 2,403,633 | Browning | July 9, 1946 |
| 2,451,155 | De Boer et al. | Oct. 12, 1948 |
| 2,457,170 | Mitchell | Dec. 28, 1948 |
| 2,476,312 | Luety | July 19, 1949 |
| 2,548,669 | Hafer et al. | Apr. 10, 1951 |
| 2,557,876 | Klema | June 19, 1951 |
| 2,563,451 | Booth | Aug. 7, 1951 |

FOREIGN PATENTS

| Number | Country | Date |
|---|---|---|
| 265,885 | Germany | Oct. 18, 1913 |
| 634,154 | France | Nov. 8, 1927 |
| 865,954 | France | Mar. 24, 1941 |
| 574,905 | Great Britain | Jan. 25, 1946 |

OTHER REFERENCES

Polidor: "Inspecting Tubosupercharger Blades," The Iron Age, January 16, 1947, pages 40–44.